United States Patent
Kitaura

(10) Patent No.: US 8,683,856 B2
(45) Date of Patent: Apr. 1, 2014

(54) CATALYST ABNORMALITY DIAGNOSIS APPARATUS

(75) Inventor: Koichi Kitaura, Odawara (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/642,398

(22) PCT Filed: Apr. 23, 2010

(86) PCT No.: PCT/JP2010/002949
§ 371 (c)(1),
(2), (4) Date: Oct. 19, 2012

(87) PCT Pub. No.: WO2011/132233
PCT Pub. Date: Oct. 27, 2011

(65) Prior Publication Data
US 2013/0180322 A1 Jul. 18, 2013

(51) Int. Cl.
*F01N 11/00* (2006.01)
(52) U.S. Cl.
USPC ....................................... 73/114.75
(58) Field of Classification Search
USPC ............... 73/23.31, 23.32, 114.69, 114.71, 73/114.72, 114.75
See application file for complete search history.

(56) References Cited

U.S. PATENT DOCUMENTS

| | | | |
|---|---|---|---|
| 7,861,514 B2 * | 1/2011 | Fujiwara et al. | 60/277 |
| 8,033,168 B2 * | 10/2011 | Katoh et al. | 73/114.75 |
| 8,387,448 B2 * | 3/2013 | Li et al. | 73/114.75 |
| 8,573,044 B2 * | 11/2013 | Fushiki | 73/114.75 |
| 2013/0036808 A1 * | 2/2013 | Kitaura et al. | 73/114.75 |

FOREIGN PATENT DOCUMENTS

| | | | |
|---|---|---|---|
| JP | 2002-364428 A | 12/2002 | |
| JP | 2008-031901 A | 2/2008 | |
| JP | 2009-167987 A | 7/2009 | |
| JP | 2009-191787 A | 8/2009 | |

* cited by examiner

*Primary Examiner* — Freddie Kirkland, III
(74) *Attorney, Agent, or Firm* — Sughrue Mion, PLLC

(57) ABSTRACT

Active air-fuel ratio control is performed to alternately control an air-fuel ratio in an area located upstream of a catalyst between a lean side and a rich side. The amount of oxygen absorbed and released by the catalyst during lean control and rich control of the air-fuel ratio is measured. When an output from the post-catalyst sensor reaches a predetermined threshold, switching is carried out between the lean control and the rich control, and the measurement of the amount of oxygen is ended. The threshold is set to be reached before the output from the post-catalyst sensor reaches a predetermined reference value. Whether the catalyst is normal or abnormal is determined based on the amount of oxygen measured until the output from the post-catalyst sensor reaches the threshold and behavior of the output from the post-catalyst sensor observed after the output from the post-catalyst sensor reaches the threshold.

9 Claims, 25 Drawing Sheets

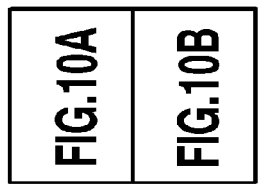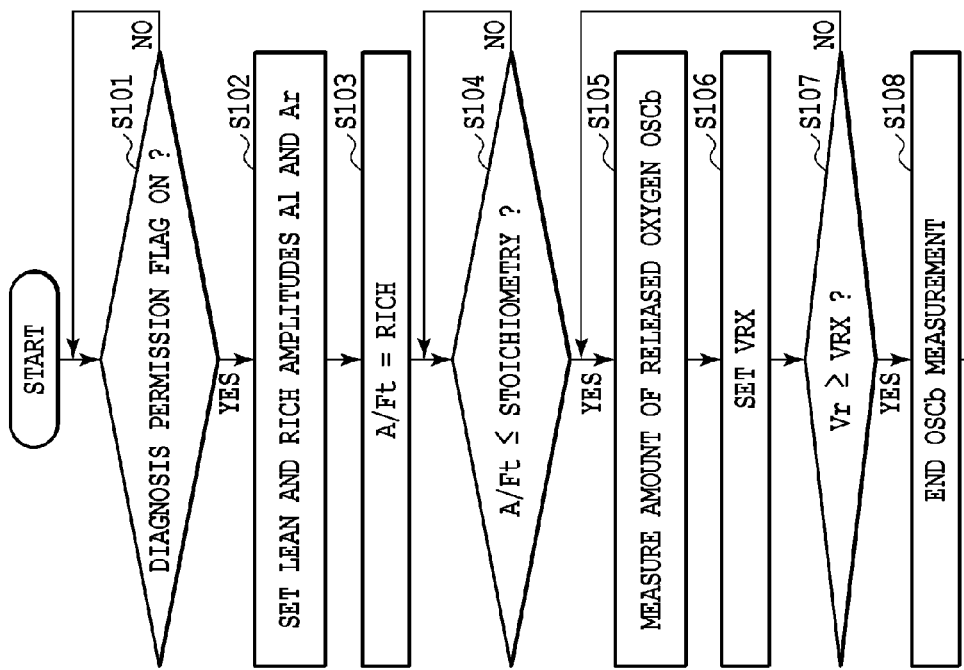

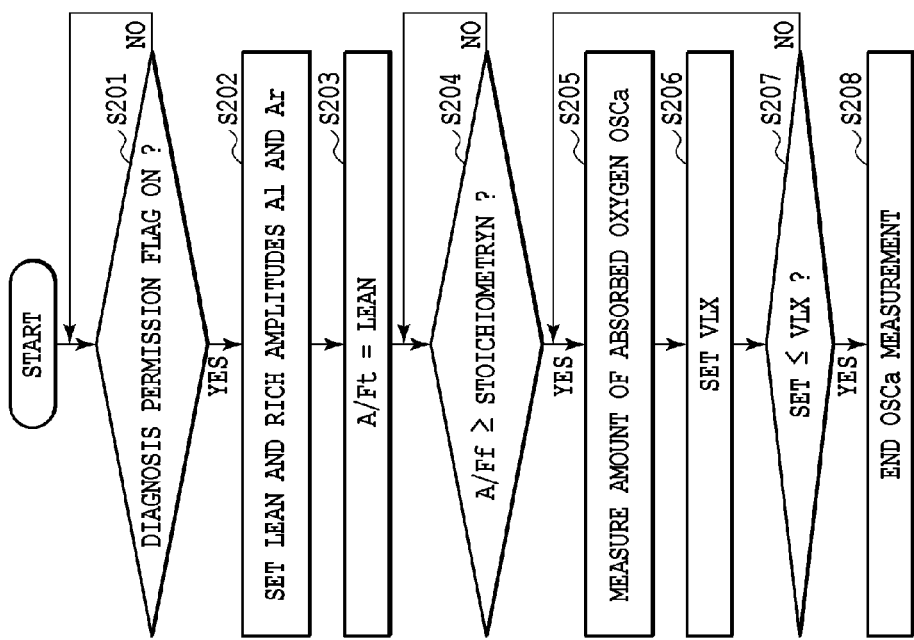

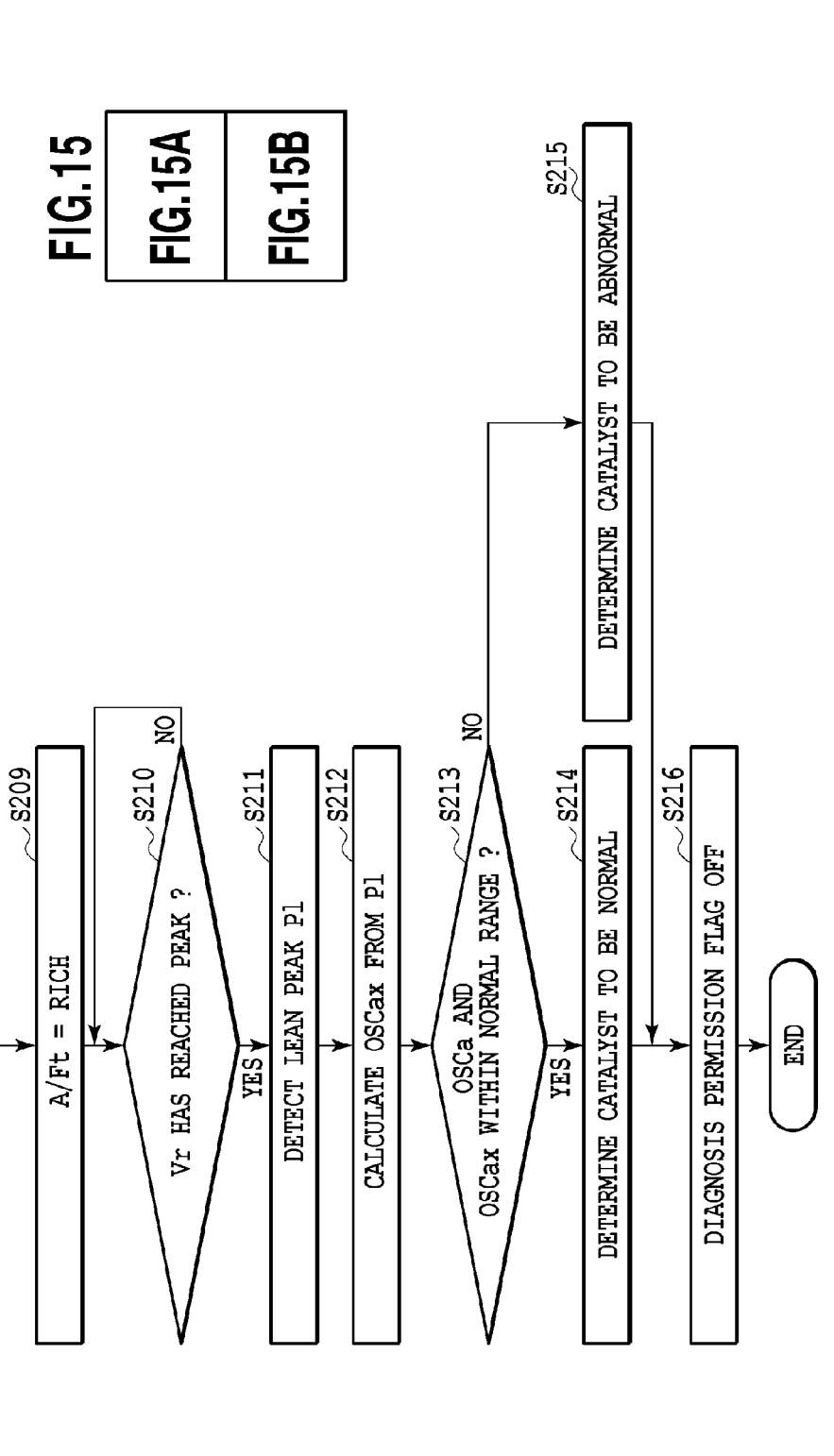

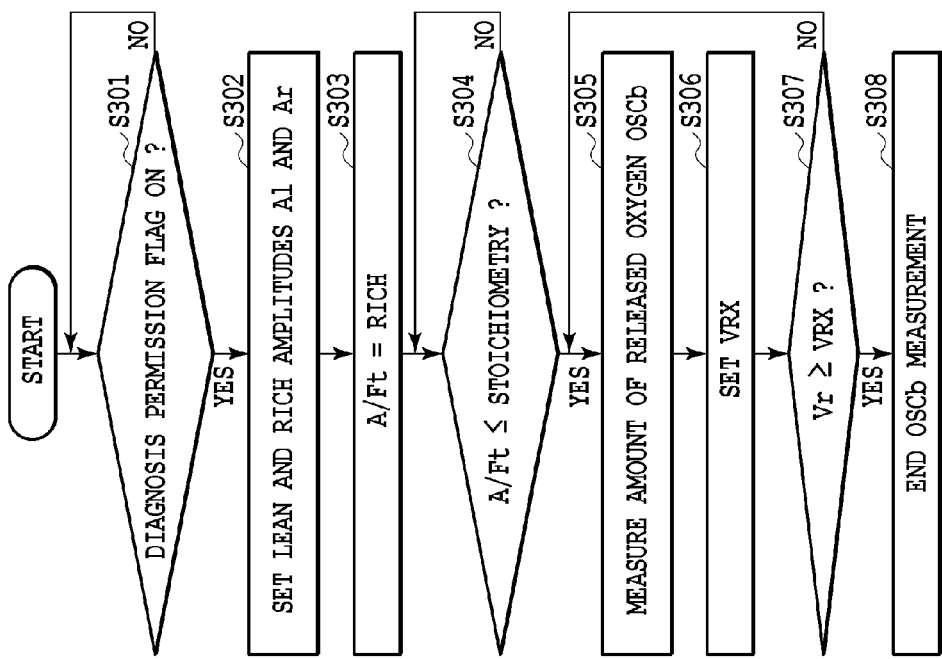

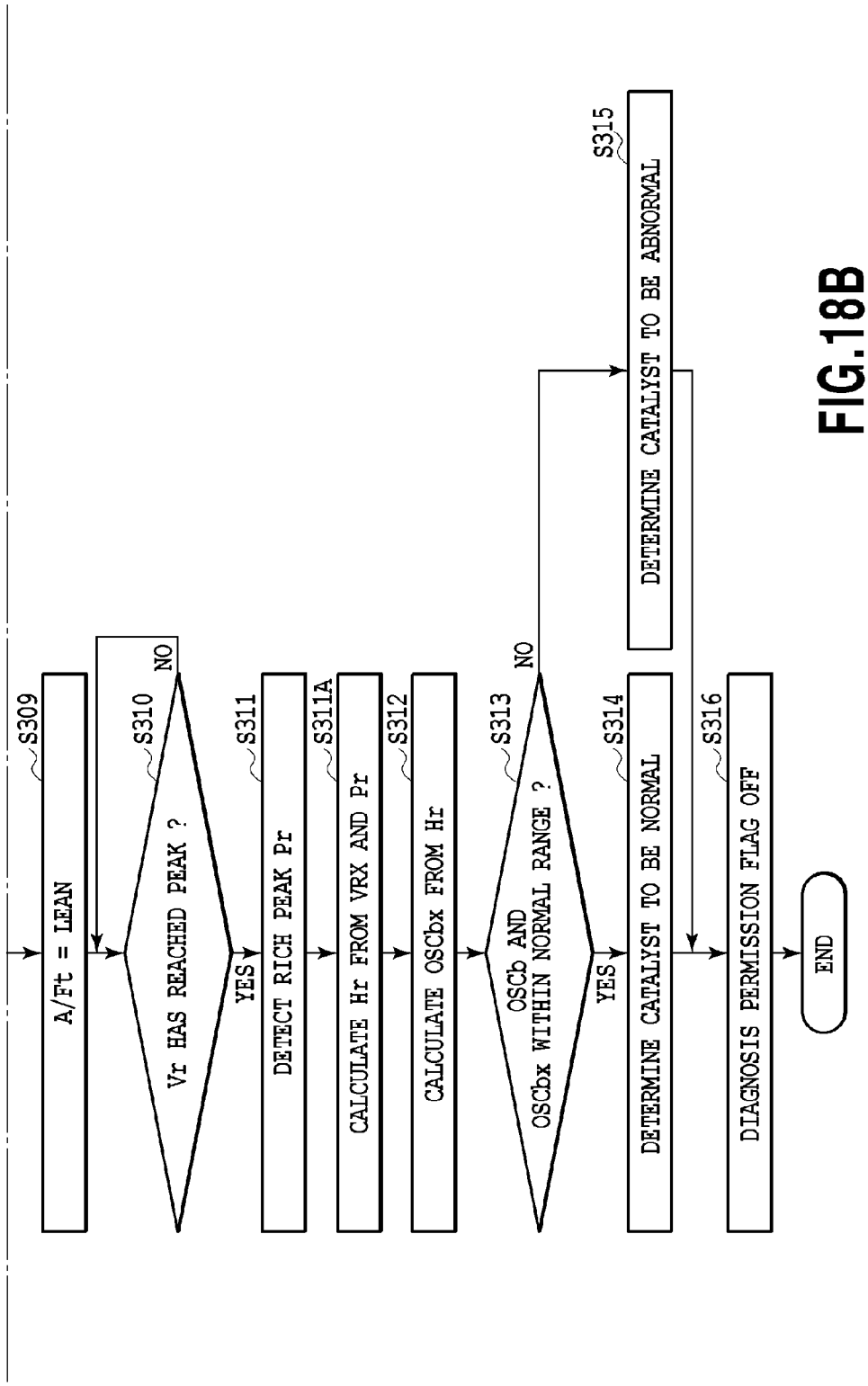

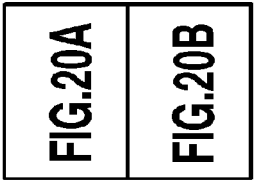
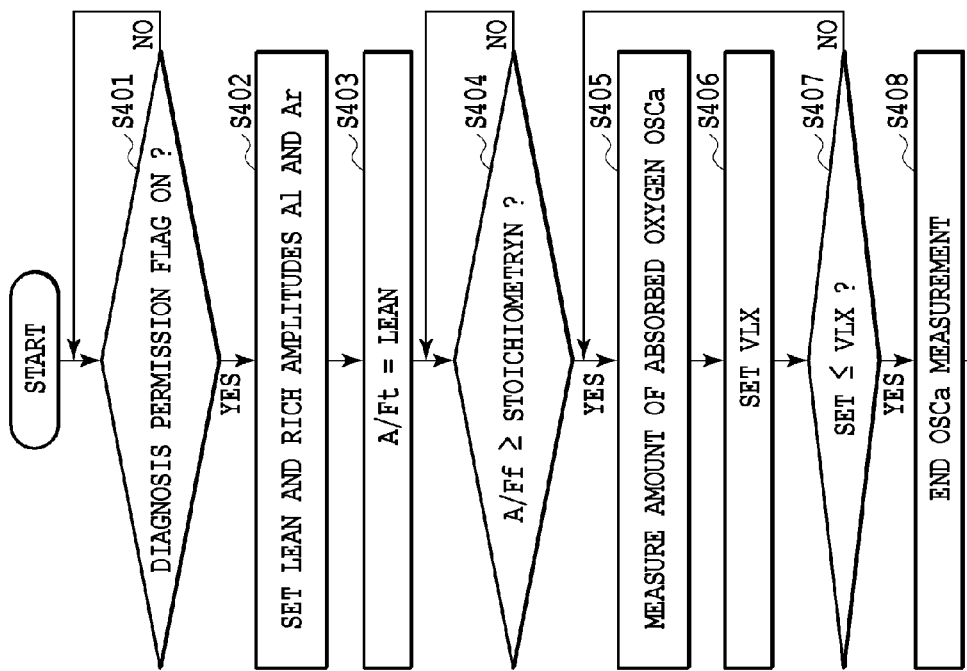

CATALYST ABNORMALITY DIAGNOSIS APPARATUS

CROSS REFERENCE TO RELATED APPLICATIONS

This application is a National Stage of International Application No. PCT/JP2010/002949 filed Apr. 23, 2010, the contents of all of which are incorporated herein by reference in their entirety.

TECHNICAL FIELD

The present invention relates to abnormality diagnosis for a catalyst, and in particular, to an apparatus that diagnoses abnormality of the catalyst arranged in an exhaust passage in an internal combustion engine.

BACKGROUND ART

For example, automobile internal combustion engines include a catalyst installed in an exhaust system to purify exhaust gas. Some such catalysts have an $O_2$ storage capability. When the air-fuel ratio of exhaust gas flowing into the catalyst is higher than a theoretical air-fuel ratio (stoichiometry), that is, the air-fuel ratio is indicative of a lean state, a catalyst with the $O_2$ storage capability absorbs excess oxygen present in the exhaust gas. When the air-fuel ratio of the exhaust gas is lower than the stoichiometry, that is, the air-fuel ratio is indicative of a rich state, the catalyst releases the absorbed oxygen. For example, a gasoline engine controls the air-fuel ratio so as to set the air-fuel ratio of the exhaust gas flowing into the catalyst close to the stoichiometry. When the gasoline engine uses a three-way catalyst with the $O_2$ storage capability, even if the actual air-fuel ratio deviates slightly from the stoichiometry, the three-way catalyst can absorb such a deviation of the air-fuel ratio by the oxygen absorbing and releasing effect.

On the other hand, a degraded catalyst has a reduced conversion efficiency. The degree of degradation of the catalyst correlates with the degree of a decrease in the $O_2$ storage capability. Thus, detection of a reduced $O_2$ storage capability enables degradation or abnormality of the catalyst to be detected. In general, the following method is adopted for the detection: active air-fuel ratio control is performed to alternately control the air-fuel ratio in an area located upstream of the catalyst between a rich side and a lean side, the amount of oxygen absorbed and released by the catalyst is measured during the lean control and the rich control, and the abnormality of the catalyst is diagnosed based on the amount of oxygen (see, for example, Patent Literature 1).

According to this Cmax method, a post-catalyst sensor is provided which detects the exhaust air-fuel ratio in an area located downstream of the catalyst. When an output from the post-catalyst sensor is inverted, then simultaneously the lean control and the rich control are switched from one to another or vice versa, and measurement of the amount of oxygen is ended.

However, when the amount of oxygen is measured, the amount of oxygen that is actually not absorbed or released is also measured, disadvantageously resulting in measurement errors. In particular, according to the conventional Cmax method, an error rate measured immediately before the inversion of the output from the post-catalyst sensor is higher when the catalyst is abnormal than when the catalyst is normal. This enhances the tendency to make the measured value larger than the real value. Then, a catalyst that is actually abnormal may be erroneously diagnosed to be normal. The Cmax method may also preclude an increase in a difference in the measured value of the amount of oxygen between the normal state and abnormal state of the catalyst. In particular, if this difference is originally small, the catalyst may not sufficiently accurately be diagnosed.

Thus, the present invention has been developed in view of the above-described circumstances. An object of the present invention is to provide a catalyst abnormality diagnosis apparatus that can improve the diagnosis accuracy to suppress erroneous diagnoses.

CITATION LIST

Patent Literature

PTL 1: Japanese Patent Laid-Open No. 2002-364428

SUMMARY OF INVENTION

An aspect of the present invention provides a catalyst abnormality diagnosis apparatus that diagnoses abnormality of a catalyst arranged in an exhaust passage in an internal combustion engine, the apparatus being characterized by including:

a post-catalyst sensor that detects an exhaust air-fuel ratio in an area located downstream of the catalyst;

active air-fuel ratio control means for alternately controlling an air-fuel ratio in an area located upstream of the catalyst between a lean side and a rich side;

measurement means for measuring an amount of oxygen absorbed and released by the catalyst during lean control and rich control of the air-fuel ratio; and determination means for determining whether the catalyst is normal or abnormal, and in that when an output from the post-catalyst sensor reaches a predetermined threshold, the active air-fuel ratio control means simultaneously switches between the lean control and the rich control, and the measurement means ends measuring the amount of oxygen, the threshold includes a lean threshold that defines a timing for switching from the lean control to the rich control and a rich threshold that defines a timing for switching from the rich control to the lean control, the lean threshold is set to a value richer than a reference lean determination value set leaner than a stoichiometry equivalent value for the output from the post-catalyst sensor, the rich threshold is set to a value leaner than a reference rich determination value set richer than the stoichiometry equivalent value, and the determination means determines whether the catalyst is normal or abnormal based on the amount of oxygen measured until the output from the post-catalyst sensor reaches one of the lean threshold and the rich threshold and behavior of the output from the post-catalyst sensor observed after the output from the post-catalyst sensor reaches one of the lean threshold and the rich threshold.

Preferably, the determination means determines whether the catalyst is normal or abnormal based on the amount of oxygen measured until the output from the post-catalyst sensor reaches one of the lean threshold and the rich threshold and a peak value of the output from the post-catalyst sensor measured after the output from the post-catalyst sensor reaches one of the lean threshold and the rich threshold.

Preferably, the determination means determines whether the catalyst is normal or abnormal based on the amount of oxygen measured until the output from the post-catalyst sensor reaches one of the lean threshold and the rich threshold and a rate of change in the output from the post-catalyst sensor which occurs after the output from the post-catalyst sensor reaches one of the lean threshold and the rich threshold.

Preferably, the change rate is the rate of change occurring after the output from the post-catalyst sensor reaches one of the lean threshold and the rich threshold and before the output from the post-catalyst sensor reaches a peak.

Preferably, the change rate has a value obtained by dividing a difference in the output from the post-catalyst sensor between a point of time when the output from the post-catalyst sensor reaches one of the lean threshold and the rich threshold and a point of time when the output from the post-catalyst sensor reaches a predetermined value, by an amount of exhaust gas measured during the period between the points of time.

Preferably, the lean threshold and the rich threshold are set to an equal value.

Preferably, each of the lean threshold and the rich threshold is set to a value equal to the stoichiometry equivalent value.

Preferably, the lean threshold is set to a value richer than the stoichiometry equivalent value, and the rich threshold is set to a value leaner than the stoichiometry equivalent value.

Preferably, each of the lean threshold and the rich threshold is set according to a flow rate of exhaust gas.

Preferably, an amplitude for the lean control and the rich control is set according to the amount of oxygen measured during a last diagnosis.

Another aspect of the present invention provides a catalyst abnormality diagnosis apparatus that to diagnose abnormality of a catalyst arranged in an exhaust passage in an internal combustion engine, the apparatus being characterized by including:

a post-catalyst sensor that detects an exhaust air-fuel ratio in an area located downstream of the catalyst;

active air-fuel ratio control means for alternately controlling an air-fuel ratio in an area located upstream of the catalyst between a lean side and a rich side;

measurement means for measuring an amount of oxygen released by the catalyst during rich control of the air-fuel ratio; and determination means for determining whether the catalyst is normal or abnormal, and in that when an output from the post-catalyst sensor reaches a predetermined rich threshold, the active air-fuel ratio control means simultaneously switches the air-fuel ratio control from the rich control to the lean control, and the measurement means ends measuring the amount of oxygen, the rich threshold is set to a value leaner than a reference rich determination value set richer than the stoichiometry equivalent value, and the determination means determines whether the catalyst is normal or abnormal based on the amount of oxygen measured until the output from the post-catalyst sensor reaches the rich threshold and behavior of the output from the post-catalyst sensor observed after the output from the post-catalyst sensor reaches the rich threshold.

Yet another aspect of the present invention provides a catalyst abnormality diagnosis apparatus that to diagnose abnormality of a catalyst arranged in an exhaust passage in an internal combustion engine, the apparatus being characterized by including:

a post-catalyst sensor that detects an exhaust air-fuel ratio in an area located downstream of the catalyst;

active air-fuel ratio control means for alternately controlling an air-fuel ratio in an area located upstream of the catalyst between a lean side and a rich side;

measurement means for measuring an amount of oxygen absorbed by the catalyst during lean control of the air-fuel ratio; and determination means for determining whether the catalyst is normal or abnormal, and in that when an output from the post-catalyst sensor reaches a predetermined lean threshold, the active air-fuel ratio control means simultaneously switches the air-fuel ratio control from the lean control to the rich control, and the measurement means ends measuring the amount of oxygen, the lean threshold is set to a value richer than a reference lean determination value set leaner than a stoichiometry equivalent value for the output from the post-catalyst sensor, and the determination means determines whether the catalyst is normal or abnormal based on the amount of oxygen measured until the output from the post-catalyst sensor reaches the lean threshold and behavior of the output from the post-catalyst sensor observed after the output from the post-catalyst sensor reaches the lean threshold.

BRIEF DESCRIPTION OF DRAWINGS

FIG. 10 is a diagram showing the relationship between FIG. 10A and FIG. 10B;

FIG. 10A is a flowchart regarding a first diagnosis processing method;

FIG. 15 is a diagram showing the relationship between FIG. 15A and FIG. 15B;

FIG. 15A is a flowchart regarding a second diagnosis processing method;

FIG. 15B is a flowchart regarding the second diagnosis processing method;

FIG. 18 is a diagram showing the relationship between FIG. 18A and FIG. 18B;

FIG. 18A is a flowchart regarding a third diagnosis processing method;

FIG. 18B is a flowchart regarding the third diagnosis processing method;

FIG. 20 is a diagram showing the relationship between FIG. 20A and FIG. 20B;

FIG. 20A is a flowchart regarding a fourth diagnosis processing method;

DESCRIPTION OF EMBODIMENTS

Preferred embodiments of the present invention will be described below with reference to the accompanying drawings.

Figure 1:
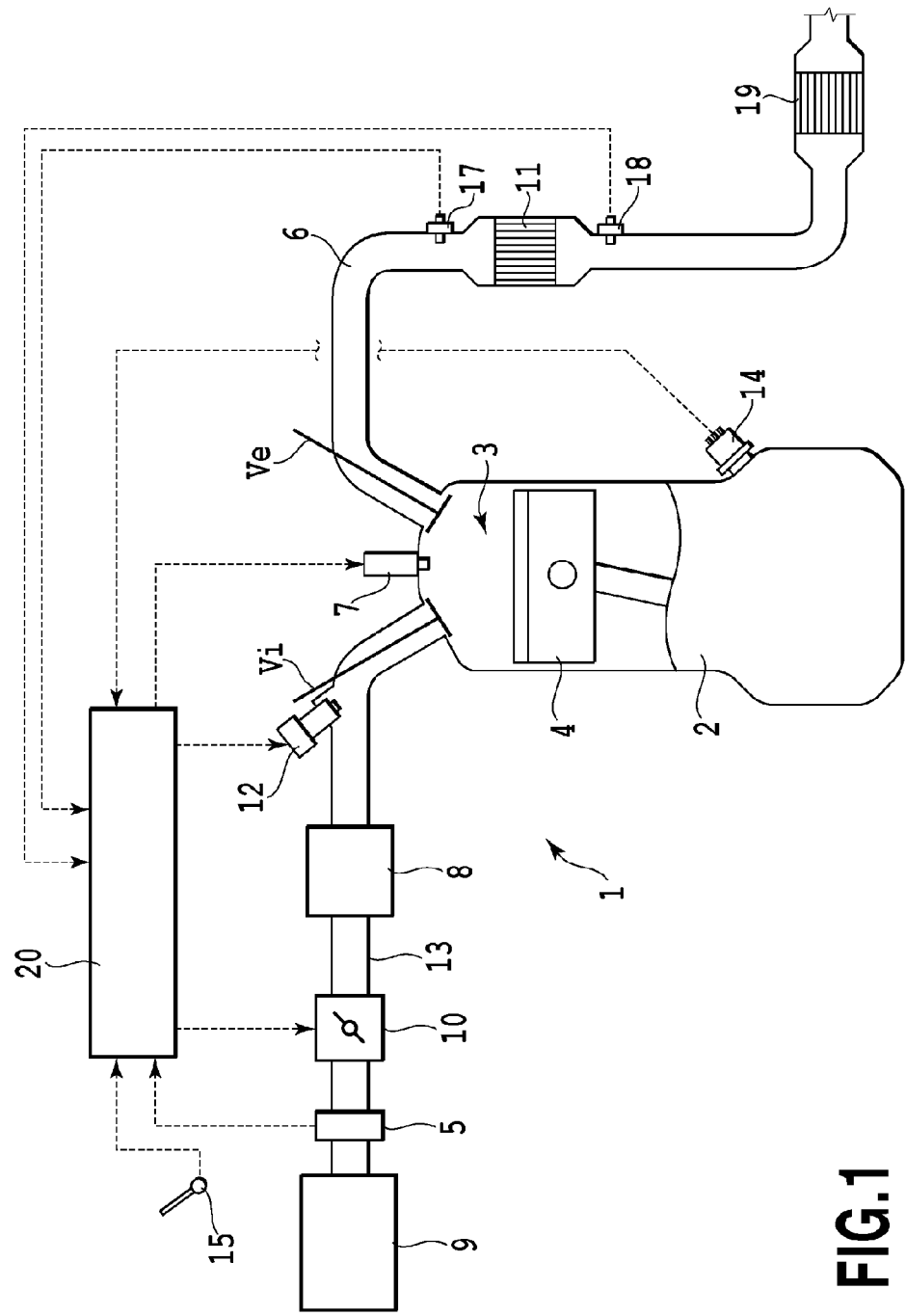
FIG. 1 is a schematic diagram showing a configuration of an embodiment of the present invention.

FIG. 1 is a schematic diagram showing a configuration according to the present embodiment. As shown in FIG. 1, an engine 1 that is an internal combustion engine combusts a mixture of fuel and air inside a combustion chamber 3 formed in a cylinder block 2 and reciprocates a piston 4 inside the combustion chamber 3 to generate power. The engine 1 according to the present embodiment is a multi-cylinder engine (only one cylinder is shown) and is a spark ignition internal combustion engine and more specifically a gasoline engine.

A cylinder head in the engine 1 includes intake valves Vi and exhaust valves Ve arranged therein so that each intake valve Vi and each exhaust value Ve correspond to one of the cylinders; the intake valve Vi opens and closes an intake port, and the exhaust valve Ve opens and closes an exhaust port. Each intake valve Vi and each exhaust valve Ve are opened and closed by a cam shaft (not shown in the drawings). Furthermore, spark plugs 7 are attached to the top of the cylinder head for the respective cylinders to ignite the air-fuel mixture in the combustion chamber 3.

The exhaust port of each cylinder is connected via an exhaust manifold to a surge tank 8 that is an exhaust assembly chamber. An intake pipe 13 forming an intake assembly passage is connected to an upstream side of the surge tank 8. An air cleaner 9 is provided at an upstream end of the intake pipe 13. The intake pipe 13 includes an air flow meter 5 and an electronically controlled throttle valve 10 provided in this order from the upstream side of the engine; the air flow meter 5 detects the amount of air flowing into the engine per unit time, that is, an intake air amount Ga (g/s). The intake port, the intake manifold, the surge tank 8, and the intake pipe 13 form an intake passage.

An intake passage, particularly an injector that injects fuel into the intake port, that is, a fuel injection valve 12, is disposed on each cylinder. Fuel injected by the injector 12 is mixed with intake air into an air-fuel mixture, which is sucked into the combustion chamber 3 when the intake valve Vi is opened. The air-fuel mixture is then compressed by the piston 4, and the compressed mixture is ignited and combusted by the spark plug 7.

On the other hand, the exhaust port in each cylinder is connected via an exhaust manifold to an exhaust pipe 6 forming an exhaust assembly passage. The exhaust port, the exhaust manifold, and the exhaust pipe 6 form an exhaust passage. The exhaust pipe 6 includes catalysts arranged on an upstream side and a downstream side thereof, respectively, and in series and each including a three-way catalyst with an $O_2$ storage capability, that is, an upstream catalyst 11 and a downstream catalyst 19. For example, the upstream catalyst 11 is located immediately after the exhaust manifold. The downstream catalyst 19 is located, for example, under the floor of the vehicle.

Figure 5:
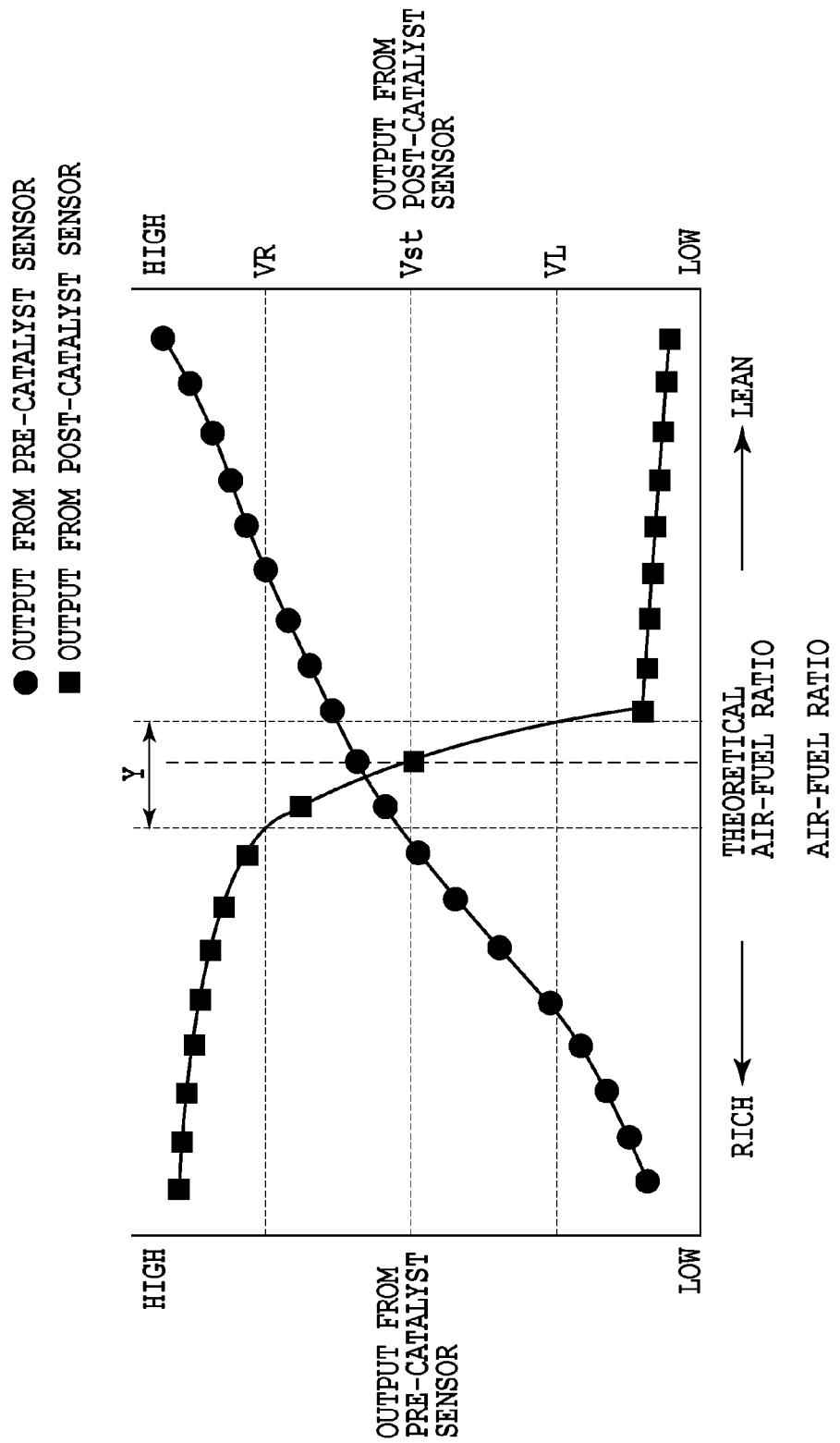
FIG. 5 is a graph showing output characteristics of a pre-catalyst sensor and a post-catalyst sensor.

Air-fuel ratio sensors that detect the air-fuel ratio of exhaust gas (exhaust air-fuel ratio), that is, a pre-catalyst sensor 17 and a post-catalyst sensor 18, are provided upstream and downstream, respectively, of the upstream catalyst 11. As shown in FIG. 5, the pre-catalyst sensor 17 is formed of what is called a wide-area air-fuel ratio sensor and can continuously detect the air-fuel ratio over a relatively wide range. The pre-catalyst sensor 17 outputs a signal proportional to the air-fuel ratio. On the other hand, the post-catalyst sensor 18 is formed of what is called an oxygen sensor ($O_2$ sensor), and has the property of rapidly changing an output value before and after a theoretical air-fuel ratio is reached (Z property).

The spark plug 7, the throttle valve 10, the injector 12, and the like are electrically connected to an electronic control unit (hereinafter referred to as an ECU) 20 serving as control means. The ECU 20 includes a CPU, a ROM, a RAM, an I/O port, and a storage device none of which is shown in the drawings. Furthermore, as shown in FIG. 5, the ECU 20 connects to, besides the air flow meter 5, the pre-catalyst sensor 17, and the post-catalyst sensor 18, a crank angle sensor 14 that detects the crank angle of the engine 1, an accelerator opening sensor 15 that detects the opening of an accelerator, and various other sensors, via A/D converters or the like. Based on detected values from the various sensors, the ECU 20 controls the spark plug 7, the injector 12, the throttle valve 10, and the like and thus an ignition period, a fuel injection amount, a fuel injection period, a throttle opening, and the like.

The upstream catalyst 11 and the downstream catalyst 19 simultaneously and very efficiently purify NOx, HC, and CO when the air-fuel ratio A/F of exhaust gas flowing into the these catalysts 11 and 19 has a theoretical value (stoichiometry, for example, A/Fs=14.6). Thus, during normal operation of the engine, the air-fuel ratio of an air-fuel mixture supplied to the combustion chamber 3 (specifically, the amount of fuel injected by the injector 12) is feedback-controlled based on an output from the pre-catalyst sensor 17 so as to make the air-fuel ratio of exhaust gas flowing into the these catalysts 11 and 19 equal to the stoichiometry.

Figure 2:
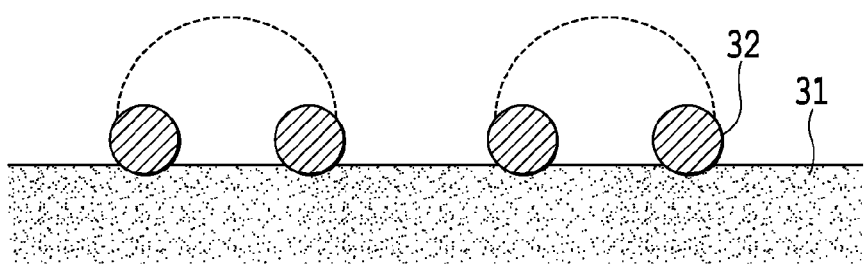
FIG. 2 is a schematic cross-sectional view showing a configuration of a catalyst.

Now, the upstream catalyst 11 to be subjected to abnormality diagnosis will be described in detail. The downstream catalyst 19 is configured similarly to the upstream catalyst 11. As shown in FIG. 2, the catalyst 11 includes a carrier substrate (not shown in the drawings) the surface of which is coated with a coat material 31 including a large number of particulate catalytic components 32 arranged in a distributive manner and carried thereon and exposed inside the catalyst 11. The catalytic components 32 are mostly formed of rare metal such as Pt or Pd and serve as active spots for causing reaction of exhaust gas components such as NOx, HC, and CO. On the other hand, the coat material 31 serves as an assistant catalyst that promotes reaction at the interface between the exhaust gas and the catalytic components 32, and contains $O_2$ storage components that can absorb and release oxygen depending on the air-fuel ratio of atmosphere gas. The $O_2$ storage components are formed of, for example, cerium dioxide $CeO_2$ or zirconium. The term "absorption" or "adsorption" is sometimes used synonymously with the term "storage".

For example, when the atmosphere gas in the catalyst is leaner than the theoretical air-fuel ratio, the $O_2$ storage components present around the catalytic components 32 absorb oxygen from the atmosphere gas, causing NOx to be reduced to allow purification. On the other hand, when atmosphere gas in the catalyst is richer than the theoretical air-fuel ratio, the oxygen stored in the $O_2$ storage components is released. The released oxygen oxidizes HC and CO to allow purification.

Even if the actual air-fuel ratio deviates slightly from the stoichiometry during normal stoichiometry air-fuel ratio control, the above-described oxygen absorbing and releasing effect allows the deviation to be absorbed.

In a new catalyst 11, a large number of the catalytic components 32 are evenly arranged in a distributive manner as described above. This keeps exhaust gas likely to come into contact with the catalytic components 32. However, when the catalyst 11 starts to be degraded, some of the catalytic components 32 may be lost or baked by exhaust heat and sintered (see a dashed line in FIG. 2). This reduces the likelihood of bringing the exhaust gas into contact with the catalytic components 32, thus decreasing a conversion efficiency. In addition, the amount of the coat material 31 present around the catalytic components 32, that is, the amount of $O_2$ storage components, decreases, thus reducing the $O_2$ storage capability itself.

As described above, the degree of degradation of the catalyst 11 correlates with the degree of a decrease in $O_2$ storage capability. Thus, the present embodiment diagnoses abnormality of the upstream catalyst 11 by detecting the oxygen storage capability of the upstream catalyst 11, which significantly affects emission, to detect the degree of degradation of the upstream catalyst 11. Here, the $O_2$ storage capability of the catalyst 11 is expressed by the magnitude of an $O_2$ storage capacity (OSC; expressed in units of gram) that is the amount of oxygen that can be absorbed or released by the current catalyst 11.

[Basic Method for Abnormality Diagnosis]

Abnormality diagnosis according to the present embodiment is based on the above-described Cmax method and thus on the following method. For abnormality diagnosis, first, the ECU 20 performs active air-fuel ratio control. That is, the ECU 20 alternately controls the air-fuel ratio in an area located upstream of the catalyst, specifically the air-fuel ratio of the air-fuel mixture in the combustion chamber 3, between the rich side and the lean side with respect to the stoichiometry A/Fs, the central air-fuel ratio. This also allows the air-fuel ratio of exhaust gas supplied to the catalyst 11 to be alternately controlled between the rich side and the lean side.

Furthermore, the active air-fuel ratio control and the diagnosis are carried out only when predetermined prerequisites are met. The prerequisites will be described below.

A method for measuring the $O_2$ storage capacity of the upstream catalyst 11 will be described below with reference to FIG. 3 and FIG. 4.

In FIG. 3(A), a dashed line indicates a target air-fuel ratio A/Ft, a solid line indicates the output from the pre-catalyst sensor 17 (a value equivalent to a pre-catalyst air-fuel ratio A/Ffr). Furthermore, in FIG. 3(B), a solid line indicates the output from the post-catalyst sensor 18 (the output voltage Vr of the post-catalyst sensor 18).

As shown in FIGS. 3(A) and 3(B), before a point of time t1, lean control is performed so as to switch the air-fuel ratio to a lean value. At this time, the target air-fuel ratio A/Ft is set equal to a lean air-fuel ratio A/Fl (for example, 15.1). Lean gas with an air-fuel ratio equal to the target air-fuel ratio is supplied to the catalyst 11. At this time, the catalyst 11 continuously absorbs oxygen. However, when the catalyst 11 is saturated, that is, becomes full of oxygen, the catalyst 11 can no longer absorb oxygen. As a result, lean gas passes through the catalyst 11 and starts to flow to an area located downstream of the catalyst 11. Then, the output from the post-catalyst sensor 18 changes to a lean side. At the point of time t1, the output voltage Vr reaches a lean determination value VL (for example, 0.2V), and then the target air-fuel ratio A/Ft is switched to a rich air-fuel ratio A/Fr (for example, 14.1). Thus, the air-fuel ratio control is switched from the lean control to the rich control, and rich gas with an air-fuel ratio equal to the target air-fuel ratio A/Ft starts to be supplied.

When rich gas is supplied, the catalyst 11 continues to release the stored oxygen. Then, all of the stored oxygen is released by the catalyst 11. At this point of time, the catalyst 11 can no longer release oxygen, and rich gas passes through the catalyst 11 and starts to flow to an area located downstream of the catalyst 11. Then, the output from the post-catalyst sensor 18 changes to the rich side. At a point of time t2, the output voltage Vr reaches a rich determination value VR (for example, 0.6V), and then the target air-fuel ratio A/Ft is switched to the rich air-fuel ratio A/Fl. Thus, the air-fuel ratio control is switched from the rich control to the lean control, and lean rich gas with an air-fuel ratio equal to the target air-fuel ratio A/Ft starts to be supplied.

The catalyst 11 absorbs oxygen again until the catalyst 11 becomes full of oxygen. Then, the output voltage Vr of the post-catalyst sensor 18 reaches the lean determination value VL. At this point of time t3, the target air-fuel ratio A/Ft is switched to the rich air-fuel ratio A/Fr, and the rich control is started.

Thus, every time the output from the post-catalyst sensor 18 is inverted, the lean control operation and the rich control operation are alternately and repeatedly performed. A set of contiguous lean and rich control operations corresponds to one cycle of active air-fuel ratio control. Predetermined N cycles (N is an integer of at least 2) of active air-fuel ratio control are carried out.

Here, the lean determination value VL serves as a reference for a threshold that defines a timing for switching from the lean control to the rich control. As also shown in FIG. 5, the lean determination value VL is defined to be a (lean-side) value smaller than a stoichiometry equivalent value Vst for the output from the post-catalyst sensor.

Similarly, the rich determination value VR serves as a reference for a threshold that defines a timing for switching from the rich control to the lean control. As also shown in FIG. 5, the rich determination value VR is defined to be a (rich-side) value larger than the stoichiometry equivalent value Vst for the output from the post-catalyst sensor.

While the active air-fuel ratio control is being performed, the $O_2$ storage capacity OSC of the catalyst 11 is measured as follows.

The time for which oxygen can be continuously absorbed or released increases consistently with the $O_2$ storage capacity of the catalyst 11. That is, the inversion period (for example, the time between t1 and t2) of the output Vr from the post-catalyst sensor is long if the catalyst is not degraded and decreases with progression of degradation of the catalyst.

Thus, this is utilized to measure the $O_2$ storage capacity OSC as follows. As shown in FIG. 4, at the point of time t1, the target air-fuel ratio A/Ft is switched to the rich air-fuel ratio A/Fr, and slightly after this, a pre-catalyst air-fuel ratio A/Ff serving as an actual value is switched to the rich air-fuel ratio A/Fr. Then, between a point of time t11 when the pre-catalyst air-fuel ratio A/Ff reaches the stoichiometry A/Fs and the point of time t2 when the output Vr from the post-catalyst sensor is inverted, an $O_2$ storage capacity dOSC is sequentially calculated at predetermined calculation intervals. Furthermore, the $O_2$ storage capacity dOSC is sequentially integrated between the point of time t1 and the point of time t2. Thus, the $O_2$ storage capacity OSC as the final integrated value for the rich control, that is, the amount of released oxygen shown in FIG. 4 as OSCb, is measured.

[Expression 1]

$$dOSC = \Delta A/F \times Q \times \sigma = |A/Ff - A/Fs| \times Q \times \sigma \quad (1)$$

"Q" denotes the amount of injected fuel, and the amount of air corresponding to insufficiency or excess with respect to the stoichiometry can be calculated by multiplying a difference in air-fuel ratio $\Delta A/F$ by the amount of injected fuel Q. "$\sigma$" denotes a constant indicative of the rate of oxygen contained in the air (the rate is about 0.23).

Figure 4:
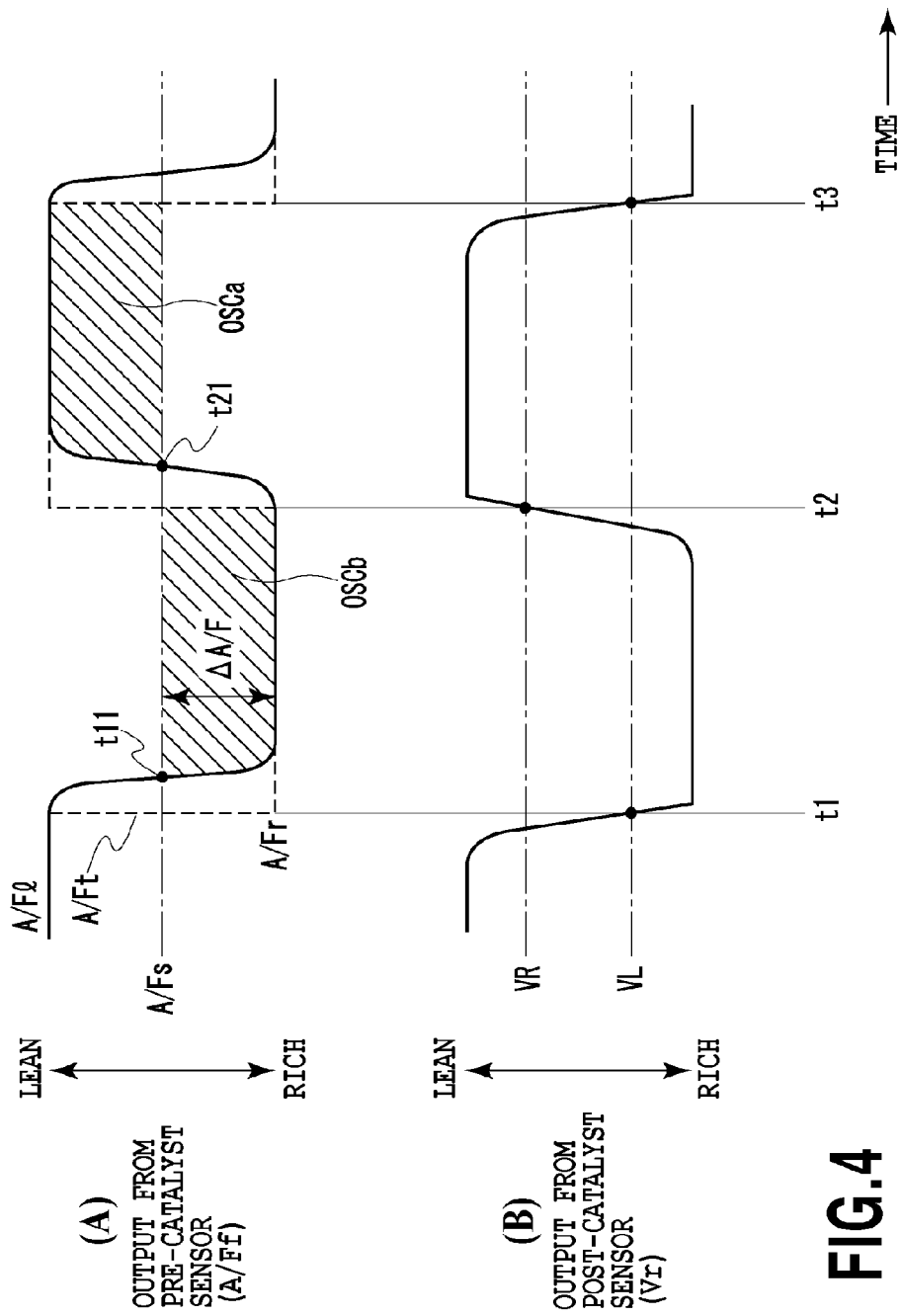
FIG. 4 is a time chart showing a method for measuring an $O_2$ storage capability in the basic method.

Also for the lean control, the $O_2$ storage capacity, that is, the $O_2$ storage capacity shown in FIG. 4 as OCSa, is measured. Every time the rich control operation and the lean control operation are alternately performed, the amount of released oxygen and the amount of absorbed oxygen are alternately measured.

Then, when a plurality of measured values of the amount of released oxygen and a plurality of measured values of the amount of absorbed oxygen are obtained, whether the catalyst is normal or abnormal is determined as follows.

First, the ECU 20 calculates the average value OSCav of the measured values of the amount of released oxygen and the amount of absorbed oxygen. The ECU 20 then compares the average value OSCav with a predetermined abnormality determination value $\alpha$. When the average value OSCav is larger than the abnormality determination value $\alpha$, the ECU 20 determines the catalyst 11 to be normal. When the average value OSCav is equal to or smaller than the abnormality determination value $\alpha$, the ECU 20 determines the catalyst 11 to be abnormal. If the catalyst is determined to be abnormal, a warning device such as a check lamp (not shown in the drawings) is preferably activated to inform the user of this fact.

[Abnormality Diagnosis Method According to the Present Embodiment]

Now, the abnormality diagnosis method according to the present embodiment will be described. The "$O_2$ storage capacity OSC" and the "amount of oxygen" collectively refer to the "amount of absorbed oxygen OSCa" and the "amount of released oxygen OSCb".

As described above, the measurement of the $O_2$ storage capacity OSC involves a measurement error problem; the amount of oxygen that is actually not absorbed or released is also measured. In particular, if the conventional Cmax method is used, when the catalyst is abnormal, the error rate measured immediately before the inversion of the output from the post-catalyst sensor is higher than when the catalyst is normal. This enhances the tendency to make the measured value larger than the real value. Then, a catalyst that is actually abnormal may be erroneously diagnosed to be normal.

Figure 6:
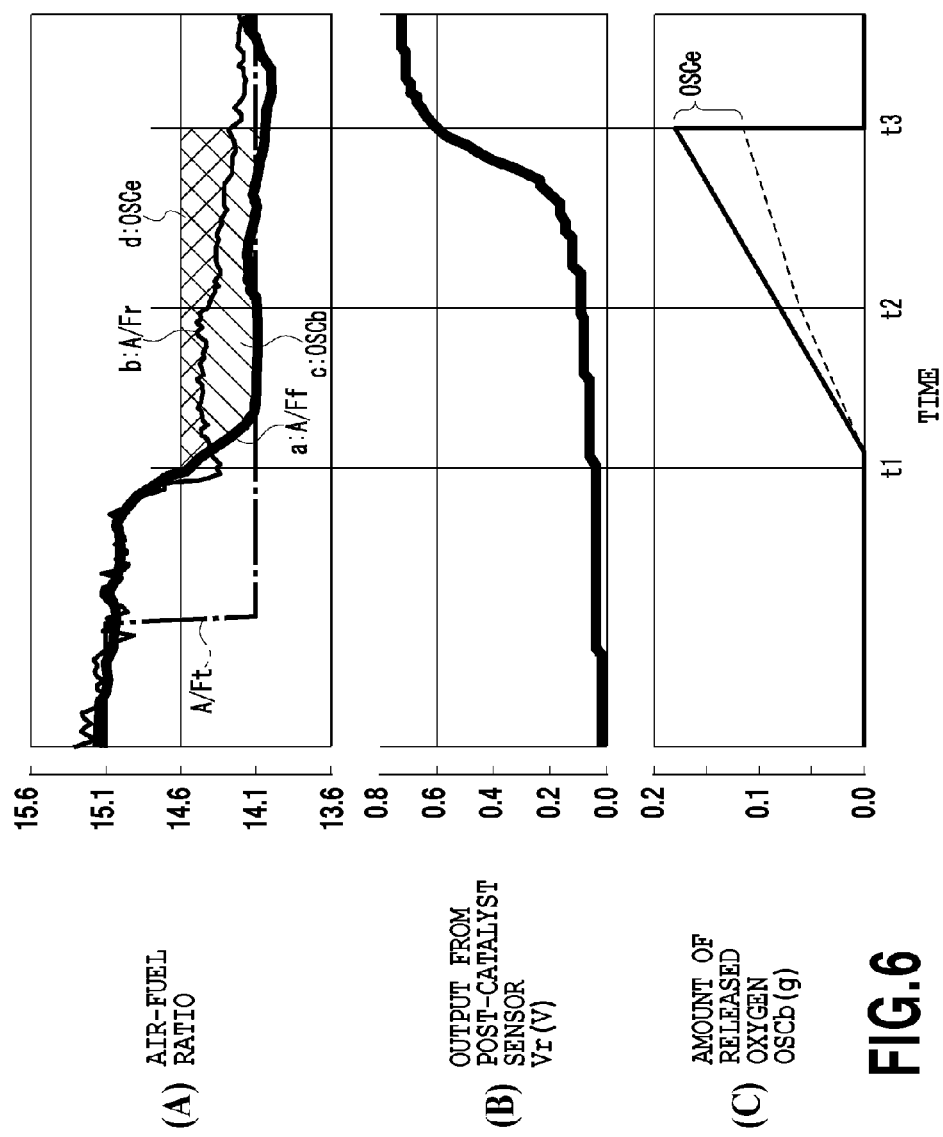
FIG. 6 is a time chart showing results of tests for rich control obtained when the catalyst is normal.
Figure 7:
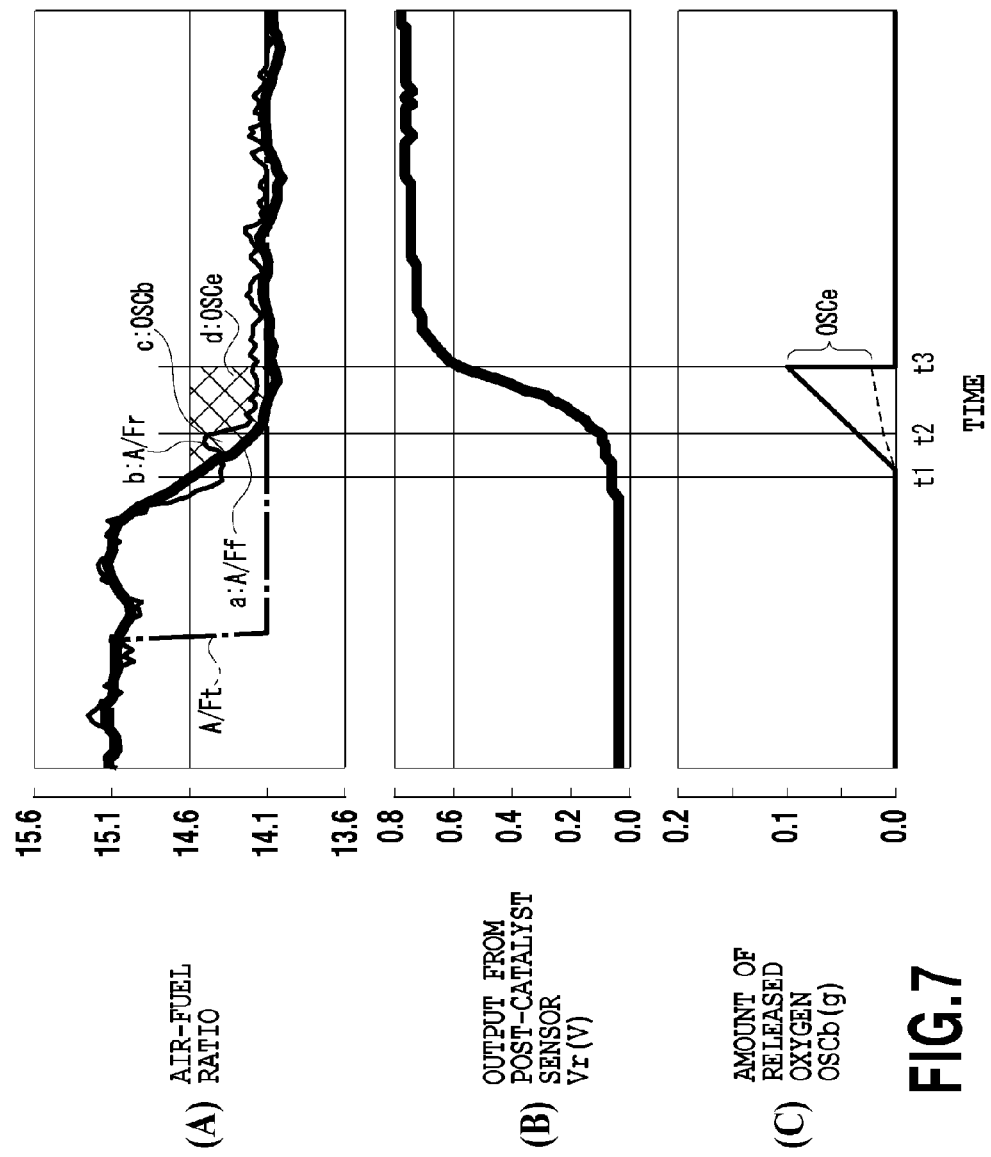
FIG. 7 is a time chart showing results of tests for rich control obtained when the catalyst is abnormal.

This will be described in detail with reference to FIG. 6 and FIG. 7. FIG. 6 shows a case where the catalyst is normal. FIG. 7 shows a case where the catalyst is abnormal. Both figures show the results of tests where the lean control is switched to the rich control. In this case, even when the output Vr from the post-catalyst sensor is inverted (that is, even when the output reaches the rich determination value), switching to the lean control is not carried out.

Both FIG. 6(A) and FIG. 7(A) show the pre-catalyst air-fuel ratio A/Ff (line (a)) detected by the pre-catalyst sensor 17, and the post-catalyst air-fuel ratio A/Fr (line (b)). Here, an air-fuel ratio sensor similar to the pre-catalyst sensor 17 is installed downstream of the catalyst for testing. The post-catalyst air-fuel ratio A/Fr is detected by this air-fuel ratio sensor.

FIG. 6(B) and FIG. 7(B) show the output Vr from the post-catalyst sensor, and FIG. 6(C) and FIG. 7(C) show the integrated value of the amount of released oxygen OSCb. The output Vr from the post-catalyst sensor may vary within the range between 0 (V) and 1 (V). The rich determination value VR for the output Vr from the post-catalyst sensor is 0.6 (V).

First, the case where the catalyst is normal as shown in FIG. 6 will be described. The pre-catalyst air-fuel ratio A/Ff decreases, and reaches the stoichiometry (=14.6) at the point of time t1. Then, the output Vr from the post-catalyst sensor increases toward the rich side, and reaches the rich determination value VR at the point of time t3. The amount of released oxygen OSCb is integrated between the point of time t1 and the point of time t3. The final integrated value of the amount of released oxygen OSCb at the point of time t3 can be expressed by the size of an area (c) shown in FIG. 6(A). The area (c) is enclosed by the stoichiometry (14.6) and the pre-catalyst air-fuel ratio A/Ff between the point of time t1 and the point of time t3.

On the other hand, within the period between t1 and t3, the post-catalyst air-fuel ratio is slightly richer than the stoichiometry. The size of an area (d) enclosed by the stoichiometry and the post-catalyst air-fuel ratio A/Fr indicates a portion of the rich gas which can actually not be treated by the catalyst, in other words, the amount of oxygen that cannot be released by the catalyst (this amount is referred to as OSCe for convenience). The size of the area (d) corresponds to an error in the total amount of released oxygen OSCb at the point of time t3.

A value obtained by subtracting the size of the area (d) (OSCe) from the size of the area (c) (OSCb) corresponds to the amount of oxygen actually released by the catalyst. Thus, the measured amount of released oxygen OSCb includes the amount of oxygen that is actually not released.

The apparatus configuration according to the present embodiment includes no air-fuel ratio sensor capable of detecting even the absolute value of the post-catalyst air-fuel ratio A/Fr. The apparatus configuration thus fails to independently measure errors themselves. For convenience, the apparatus configuration determines the size of the area (c) enclosed by the stoichiometry and the pre-catalyst air-fuel ratio to be the amount of released oxygen OSCb.

Now, the post-catalyst air-fuel ratio A/Fr and the output Vr from the post-catalyst sensor will be discussed. At the point of time t2 between the point of time t1 and the point of time t3, the post-catalyst air-fuel ratio A/Fr starts to decrease toward the rich side, and the speed at which the output Vr from the post-catalyst sensor increases toward the rich side or the change rate of the output Vr starts to increase. This may mean that the catalyst substantially ends releasing oxygen at the point of time t2 and then relatively slowly releases oxygen remaining therein or that the main oxygen release, which ends at the point of time t2, is followed by secondary release of the remaining oxygen.

Even during the period between the point of time t2 and the point of time t3, there is a difference between the post-catalyst air-fuel ratio A/Fr and the pre-catalyst air-fuel ratio A/Ff. Oxygen is actually released, with rich gas treated. Thus, errors are expected to account for a relatively small percentage of the amount of released oxygen OSCb measured during the period between t2 and t3. When the catalyst is normal, the total amount of released oxygen measured during the whole period between t1 and t3 has a large value. Thus, the errors during the period between t2 and t3 are expected to account for a relatively small percentage of the total amount of released oxygen.

FIG. 6(C) schematically shows the amount of oxygen OSCe corresponding to the errors. The amount of oxygen OSCe corresponding to the errors accounts for a relatively small percentage of the total amount of released oxygen at the point of time t3.

In contrast, if the catalyst is abnormal as shown in FIG. 7, there is almost no difference between the post-catalyst air-fuel ratio A/Fr and the pre-catalyst air-fuel ratio A/Ff during the period between the point of time t2 and the point of time t3. This means that the catalyst releases substantially no oxygen. However, even during the period between t2 and t3, the difference between the stoichiometry and the pre-catalyst air-fuel ratio A/Ff is integrated so that the measured amount of released oxygen indicates that the catalyst is releasing oxygen.

Thus, errors are expected to account for a very large percentage of the amount of released oxygen OSCb measured during the period between t2 and t3. If the catalyst is abnormal, the total amount of released oxygen measured during the whole period between t1 and t3 has only a small value, and thus the errors during the period between t2 and t3 are expected to account for a large percentage of the total amount of released oxygen.

FIG. 7(C) schematically shows the amount of oxygen OSCe corresponding to the errors. The amount of oxygen OSCe corresponding to the errors accounts for a large percentage of the total amount of released oxygen measured at the point of time t3.

As described above, according to the basic method, when the catalyst is abnormal, the error rate measured immediately before the inversion of the output from the post-catalyst sensor is higher than when the catalyst is normal. This increases the rate of increase in measured value with respect to the real value. Then, a catalyst that is actually abnormal may be erroneously diagnosed to be normal.

Furthermore, the basic method fails to increase the difference in the measured value of the amount of oxygen between the normal state and abnormal state of the catalyst. In particular, if this difference is originally small, the catalyst may not sufficiently accurately be diagnosed. There has been a recent tendency to reduce the amount of rare metal in catalysts. Catalysts with the reduced amount of rare metal originally have only a small difference in the amount of oxygen that can be absorbed and released, between the normal state and the abnormal state. Thus, a high error rate prevents determination of a slight difference in the amount of oxygen between the normal state and abnormal state of the catalyst, precluding a sufficient diagnosis accuracy from being ensured.

This problem also results from control delay occurring temporally close to inversion of the output from the post-catalyst sensor. That is, the post-catalyst sensor 18 involves a response delay in which even the actual supply of rich gas fails to allow the output to immediately switch to the rich side. The post-catalyst sensor 18 also involves a transportation delay in which after the air-fuel ratio in the combustion chamber 3 is switched to a rich value, a certain time is required for the rich gas to reach the vicinity of the catalyst. The response delay and the transportation delay are collectively referred to as a control delay. During a control delay, unpurified rich gas is discharged by the catalyst, thus degrading emission.

In the example in FIG. 7, emission degradation caused by a response delay is suppressed if the output Vr from the post-catalyst sensor instantaneously reaches the rich determination value VR at the point of time t2 when a significant amount of rich gas starts to leak from the catalyst. However, this does not actually occur, and thus the response delay significantly degrades the emission. Furthermore, even if the air-fuel ratio is switched to a lean value at the point of time t3, rich gas is supplied to the catalyst during a transportation delay and cannot be treated by the catalyst. Hence, emission degradation also results from a transportation delay.

The above described example relates to the rich control. However, a similar problem is involved in the lean control.

Thus, to solve this problem, the present embodiment changes the diagnosis method from the basic method. In brief, first, the measurement of the amount of oxygen itself is ended at a timing earlier than in the conventional art, for example, at such a timing as the point of time t2 shown in FIG. 6 and FIG. 7. This allows avoidance, whenever possible, of measurement of the amount of oxygen that is actually not absorbed or released after the substantial end of the absorption and release of oxygen by the catalyst, enabling a sharp reduction in error rate.

Second, the behavior of the output from the post-catalyst sensor observed after inversion is noted and utilized. After the catalyst substantially ends absorbing or releasing oxygen, untreated gas in the catalyst (rich gas or lean gas) flows out from the catalyst. At this time, a higher degree of abnormality of the catalyst increases the degree of richness or leanness of untreated gas and results in a tendency to cause the output from the post-catalyst sensor to change rapidly and significantly. Thus, the degree of abnormality of the catalyst can be estimated by utilizing the behavior of the output from the post-catalyst sensor observed after the end of the measurement.

Of course, the degree of abnormality of the catalyst is also expressed by the measured value of the amount of oxygen. Thus, the present embodiment determines whether the catalyst is normal or abnormal based on the measured value of the amount of oxygen and the behavior of the output from the post-catalyst sensor observed after the end of the measurement.

Figure 8:
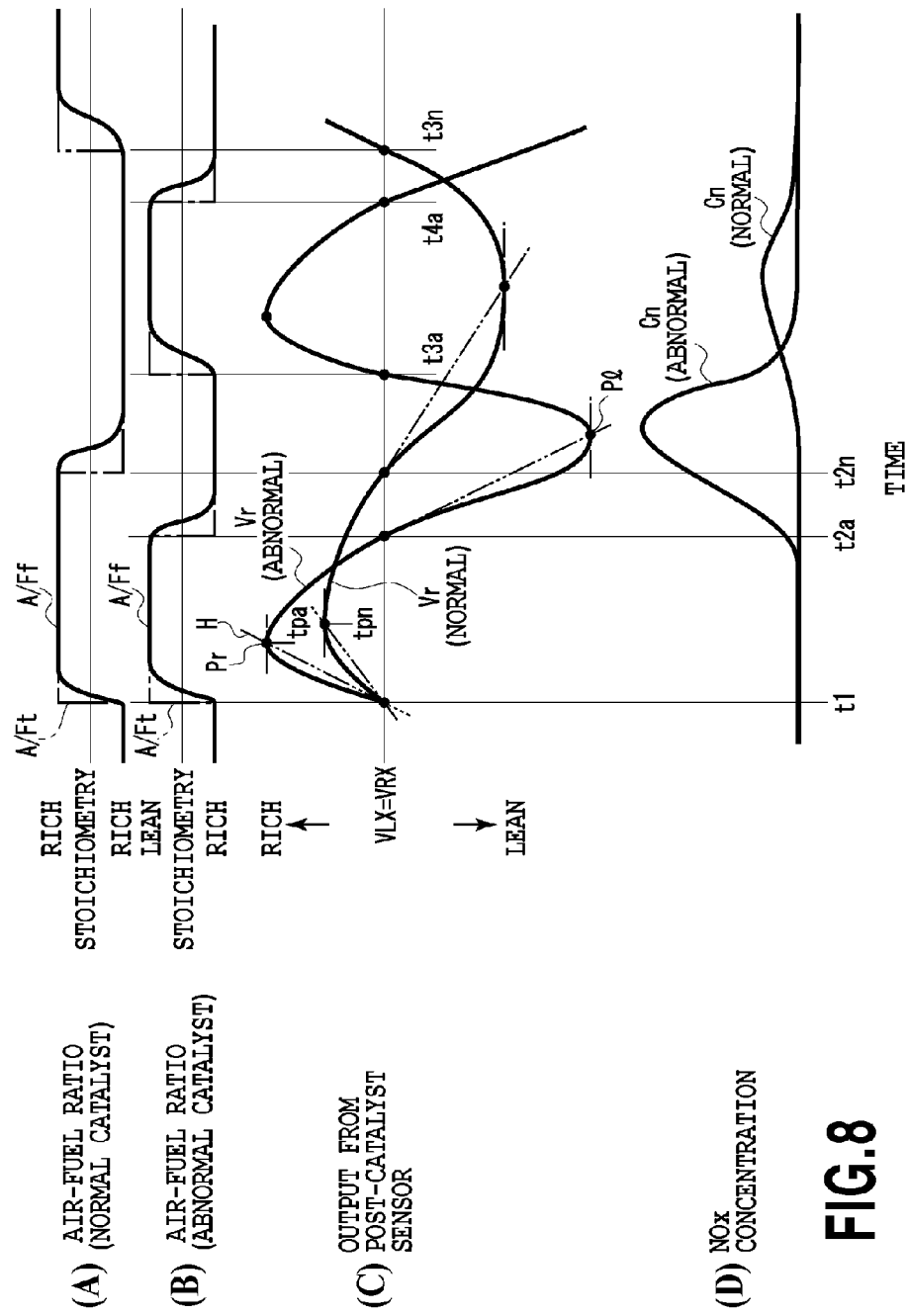
FIG. 8 is a time chart showing changes in relevant values during abnormality diagnosis according to the present embodiment.

FIG. 8 shows changes in relevant values during abnormality diagnosis according to the present embodiment. FIG. 8(A) shows the target air-fuel ratio A/Ft and the pre-catalyst air-fuel ratio A/Ff obtained when the catalyst is normal. FIG. 8(B) shows the target air-fuel ratio A/Ft and the pre-catalyst air-fuel ratio A/Ff obtained when the catalyst is abnormal.

FIG. 8(C) shows the output Vr from the post-catalyst sensor obtained when the catalyst is normal and when the catalyst is abnormal. FIG. 8(D) shows the NOx concentration of exhaust gas discharged by the upstream catalyst 11.

As shown in the figures, at the point of time t1, the air-fuel ratio control is switched from the rich control to the lean control. Thereafter, when the catalyst is normal, the air-fuel ratio control is switched to the rich control at a point of time t2$n$, and the rich control is then switched to the lean control at a point of time tan. When the catalyst is abnormal, the air-fuel ratio control is switched to the rich control at a point of time t2$a$, the rich control is then switched to the lean control at a point of time t3$a$, and the lean control is further switched to the rich control at a point of time t4$a$.

Although not shown in the drawings, the measurement of the amount of absorbed or released oxygen is ended simultaneously with the switching between the lean control and the rich control.

A threshold for the output Vr from the post-catalyst sensor which defines the above-described switching timings includes two types of thresholds, a lean threshold VLX that defines a timing for switching from the lean control to the rich control and a rich threshold VRX that defines a timing for switching from the rich control to the lean control.

Figure 9:
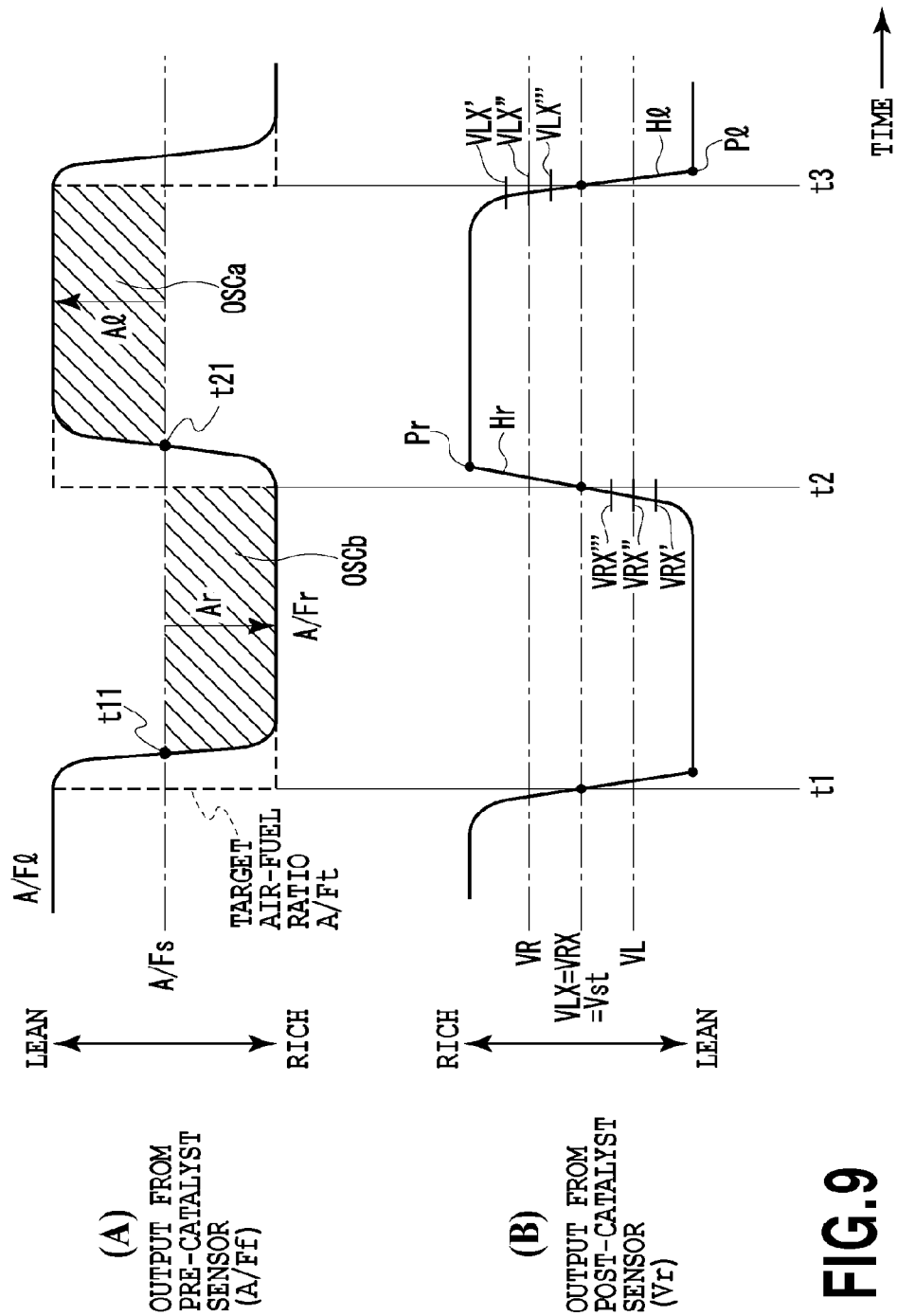
FIG. 9 is a time chart obtained by modifying FIG. 3 and FIG. 4 in conformity with the present embodiment.

As shown in FIG. 9, the lean threshold VLX is set to a value richer than the lean determination value VL. The rich threshold VRX is set to a value leaner than the rich determination value VR. In particular, in the example shown in FIG. 8, the lean threshold VLX and the rich threshold VRX are set to an equal value and is specifically set equal to the stoichiometry equivalent value Vst (for example, 0.5 (V)).

Figure 3:
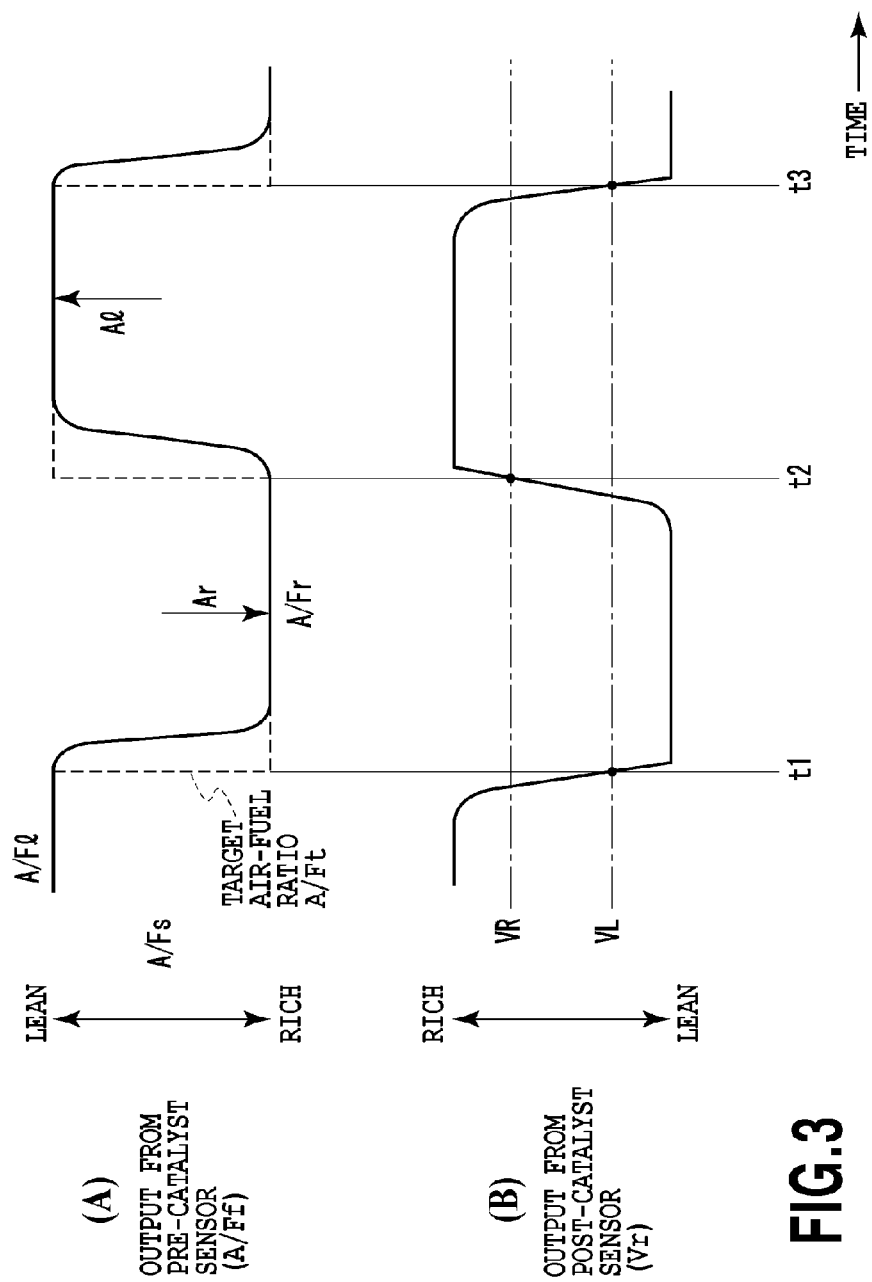
FIG. 3 is a time chart of active air-fuel ratio control in a basic method.

Thus, the inversion of the output Vr from the post-catalyst sensor and the switching of the air-fuel ratio control are set to take place at timings earlier than those according to the above-described basic method (FIG. 3 and FIG. 4). This enables minimization of measuring the amount of oxygen that is not actually absorbed and released, reducing diagnosis errors.

Furthermore, in FIG. 8, the behavior of the output Vr from the post-catalyst sensor observed after the output Vr reaches each of the thresholds VLX and VRX is to be noted. For example, after switching to the lean control (t1), when the catalyst is abnormal, the output Vr from the post-catalyst sensor increases more rapidly toward the rich side than when the catalyst is normal, with the maximum peak (rich peak) having a large value.

In contrast, after switching to the rich control (t2n and t2a), when the catalyst is abnormal, the output Vr from the post-catalyst sensor decreases more rapidly toward the lean side than when the catalyst is normal, with the minimum peak (lean peak) having a small value.

Thus, when the catalyst tends to be abnormal, the output Vr from the post-catalyst sensor changes rapidly and significantly after switching. Consequently, the degree of abnormality of the catalyst can be estimated based on the output Vr from the post-catalyst sensor measured at a predetermined timing after switching, preferably at a timing tp (tpa, tpn) when the output Vr from the post-catalyst sensor is at its peak.

Specifically, the degree of abnormality of the catalyst can be estimated from the peak value of the output Vr from the post-catalyst sensor itself. Alternatively, the degree of abnormality of the catalyst can be estimated from the absolute value of the difference between the peak value of the output Vr from the post-catalyst sensor and the output Vr from the post-catalyst sensor measured at the time of switching (threshold VLX or VRX).

Alternatively, the degree of abnormality of the catalyst can be estimated from the rate H of a change (or inclination) in the output Vr from the post-catalyst sensor between the time of switching (for example, t1) and a predetermined timing, preferably the peak timing tp.

Now, the change rate of the output Vr from the post-catalyst sensor will be discussed. For example, when the catalyst is abnormal, for a period between the point of time t1 and a peak timing immediately after the point of time t1, the change rate H can be defined by $H=(Pr-VRX)/(tpa-t1)$. The denominator of the change rate H is time, and the change rate H can be defined to be the rate of change per unit time.

On the other hand, in this case, the change rate H may disadvantageously vary depending on the flow rate of exhaust gas and increase consistently with the flow rate of exhaust gas.

Thus, to eliminate the adverse effects of the flow rate of exhaust gas, preferably the denominator of the change rate H is the amount of exhaust gas and the change rate H is defined to be the rate of change per a certain amount of exhaust gas. Specifically, the flow rate of exhaust gas is integrated between the point of time t1 and a peak timing immediately after the point of time t1, and the amount M of exhaust gas passing through the catalyst during this period is determined. Then, (Pr−VRX) is divided by the amount M of exhaust gas to obtain the change rate H.

The flow rate of exhaust gas may be detected by a separately provided exhaust gas sensor. However, the present embodiment uses the value of the amount of intake air Ga detected by the air flow meter 5 instead.

Furthermore, the numerator of the change rate H need not necessarily be the difference (Pr−VRX) between the rich peak Pr of the output Vr from the post-catalyst sensor and an output VRX from the post-catalyst sensor measured at the time of switching. For example, the numerator may be the difference (Vr1−VRX) between an output Vr1 from the post-catalyst sensor measured at a timing when the output Vr from the post-catalyst sensor has increased by a predetermined value (for example, 0.1 (V)) since the time of switching and the output VRX from the post-catalyst sensor measured at the time of the switching. Alternatively, the numerator may be an output Vr2 from the post-catalyst sensor measured when the pre-catalyst air-fuel ratio A/Ff reaches the stoichiometry immediately after switching and the output VRX from the post-catalyst sensor measured at the time of the switching.

NOx concentrations Cn and Ca shown in FIG. 8(D) indicate the concentrations of NOx discharged by the catalyst immediately after the end of the lean controls (t1 to t2n or t1 to t2a). The NOx concentrations Cn and Ca correlate with the behavior of the output Vr from the post-catalyst sensor observed immediately after the end of the lean control. That is, when the catalyst tends to be abnormal and as the output Vr from the post-catalyst sensor changes rapidly and significantly (that is, as the absolute value of the change rate H increases or the lean peak value P1 decreases), the NOx concentration increases rapidly and significantly. Then, the emission tends to be degraded.

Of course, since the inversion of the output Vr from the post-catalyst sensor is set to take place at a timing earlier than that according to the basic method, the degree of emission degradation is lower than according to the basic method.

FIG. 9 is a diagram obtained by modifying FIG. 3 and FIG. 4 in conformity with the present embodiment in order to make differences from the basic method easily understood. The lean threshold VLX and the rich threshold VRX are set equal to the stoichiometry equivalent value Vst.

For example, during the rich control period (according to the preset embodiment, between t1 and t2), the basic method does not carryout the switching unless the output Vr from the post-catalyst sensor increases to the rich determination value VR, which is larger than the stoichiometry equivalent value Vst. In contrast, the present embodiment carries out the switching provided that the output Vr from the post-catalyst sensor increases to the rich threshold VRX, which is leaner than the rich determination value VR. Thus, the present embodiment carries out the switching at an earlier timing.

The rich threshold VRX may be set to a value smaller (leaner) than the stoichiometry equivalent value Vst. The rich threshold VRX may be set to a value VRX' smaller than the lean determination value VL (for example, 0.2 V), to a value VRX" equal to the lean determination value VL, or to a value VRX''' between the lean determination value VL and the stoichiometry equivalent value Vst.

Alternatively, the rich threshold VRX may be defined to be the value of the output Vr from the post-catalyst sensor obtained at a timing when the output Vr from the post-catalyst sensor starts to increase, specifically, a timing when the differential value of the output Vr from the post-catalyst sensor becomes larger than a predetermined positive value. This is because the catalyst substantially ends releasing oxygen at this timing. If the catalyst has a particularly high degree of abnormality, the timing when the catalyst substantially ends absorbing or releasing oxygen may be suitably sensed by using the differential value of the output Vr from the post-catalyst sensor.

On the other hand, during the lean control period (according to the preset embodiment, between t2 and t3), the basic method does not carryout the switching unless the output Vr from the post-catalyst sensor decreases to the lean determination value VL, which is smaller than the stoichiometry equivalent value Vst. In contrast, the present embodiment carries out the switching provided that the output Vr from the post-catalyst sensor decreases to the lean threshold VLX, which is richer than the lean determination value VL. Thus, the present embodiment carries out the switching at an earlier timing.

The lean threshold VLX may be set to a value larger (richer) than the stoichiometry equivalent value Vst. The lean threshold VLX may be set to a value VLX' larger than the rich determination value VR (for example, 0.6 V), to a value VLX" equal to the rich determination value VR, or to a value VLX''' between the rich determination value VR and the stoichiometry equivalent value Vst. Alternatively, the lean threshold VLX may be defined to be the value of the output Vr from the post-catalyst sensor obtained at a timing when the output Vr from the post-catalyst sensor starts to decrease, specifically, at a timing when the differential value of the output Vr from the post-catalyst sensor becomes smaller than a predetermined negative value. In any way, the rich threshold VRX and the lean threshold VLX may be set to the optimum value with test results and the like taken into account.

For example, during the rich control period between t1 and t2, the amount of released oxygen OSCb is integrated and measured between the point of time t11 and the point of time t2. The measured value is smaller than the measured value obtained by the basic method. Then, after the point of time t2, during the lean control period after switching, the rich peak Pr of the output Vr from the post-catalyst sensor is detected, or the rate Hr of rich change measured until the rich peak Pr is detected. Then, whether the catalyst is normal or abnormal is determined based on the measured amount of released oxygen OSCb and the detected rich peak Pr or rich change rate Hr.

Similarly, also during the lean control period between t2 and t3, the amount of absorbed oxygen OSCa is integrated and measured between the point of time t21 and the point of time t3. The measured value is smaller than the measured value obtained by the basic method. Then, after the point of time t3, during the rich control period after switching, the lean peak Pl of the output Vr from the post-catalyst sensor is detected, or the rate Hl of lean change measured until the lean peak Pl is detected. Then, whether the catalyst is normal or abnormal is determined based on the measured amount of absorbed oxygen OSCa and the detected lean peak Pl or lean change rate Hl.

The present embodiment may be varied as follows. That is, whether the catalyst is normal or abnormal is determined based only on the amount of absorbed oxygen OSCa measured during the lean control and the behavior of the output from the post-catalyst sensor observed during the subsequent rich control. In this case, the lean threshold VLX is set to a value richer than the stoichiometry equivalent value Vst.

Emission is degraded more significantly when the air-fuel ratio deviates toward the rich side with respect to the stoichiometry than when the air-fuel ratio deviates toward the lean side with respect to the stoichiometry. That is, NOx, discharged in the latter case, more significantly affects the emission than CO and HC, discharged in the former case. In this regard, the output from the post-catalyst sensor may be controllably set slightly closer to the rich-side target value than to the stoichiometry equivalent value Vst, as is the case with normal stoichiometric control.

Furthermore, when the lean threshold VLX is set to a value richer than the stoichiometry equivalent value Vst, the output from the post-catalyst sensor can be allowed to change by a larger amount when changing from the lean threshold VLX toward the lean side. This increases resolution.

Thus, the present embodiment may be advantageous for improving the diagnosis accuracy and suppressing emission degradation during diagnosis.

[Abnormality Diagnosis Process According to the Present Embodiment]

Figure 10B:
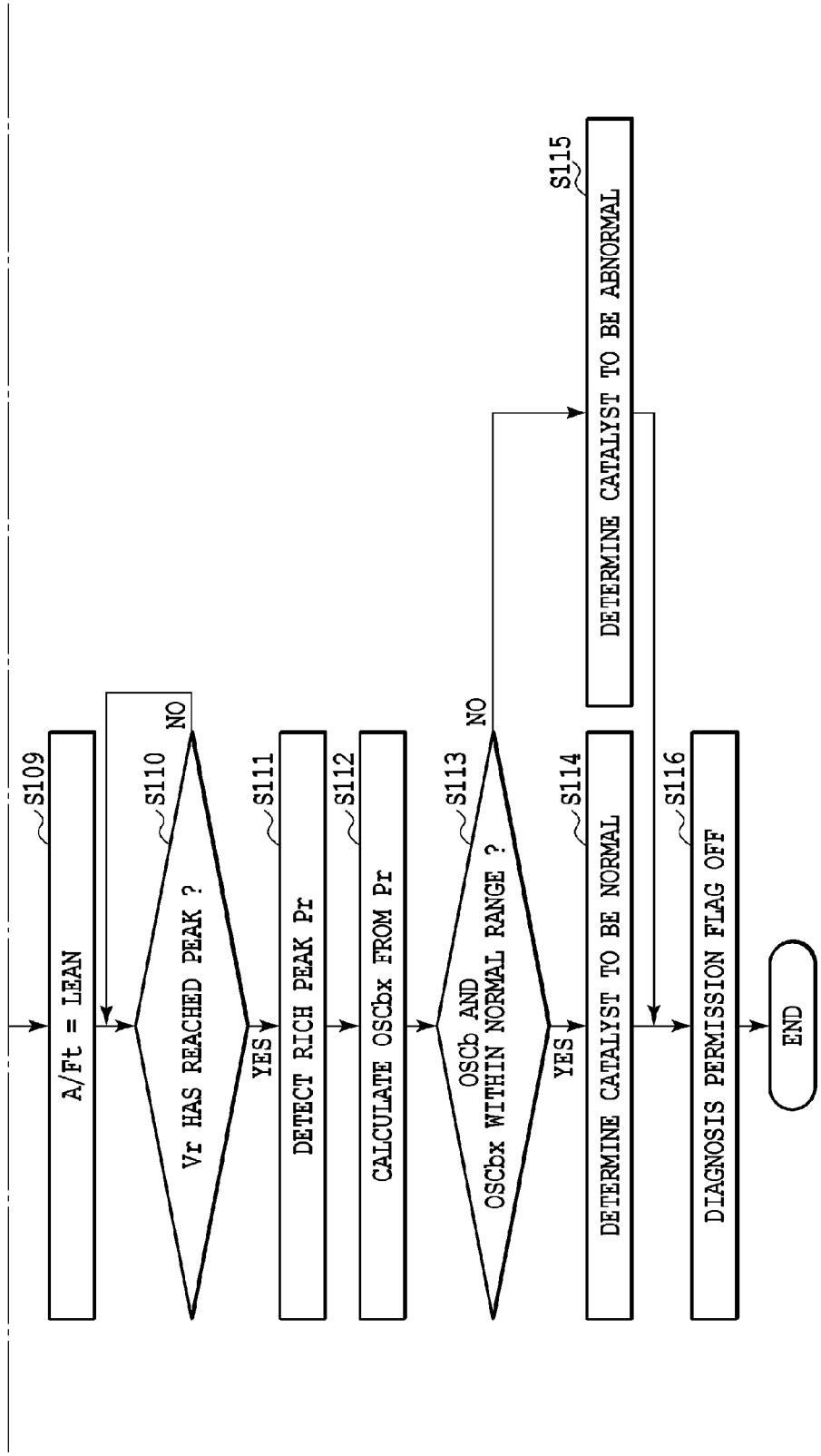
FIG. 10B is a flowchart regarding the first diagnosis processing method.

Now, an abnormality diagnosis process according to the present embodiment which is carried out by the ECU 20 will described. First, a first diagnosis processing method will be described with reference to FIG. 10A and FIG. 10B. The first diagnosis processing method uses the value of the rich peak Pr of the output Vr from the post-catalyst sensor.

In the first step S101, the routine determines whether or not diagnosis permission flag is on. The diagnosis permission flag is turned on when prerequisites for diagnosis are established. The prerequisites include (1) the condition that the amount of intake air Ga and the temperature of the catalyst Tc are in a predetermined relationship. The amount of intake air Ga is detected by the air flow meter 5. The temperature of the catalyst Tc is estimated by the ECU 20 based on the operating condition of the engine but may be detected directly by a temperature sensor.

If the engine is operating steadily, that is, if the rotation speed of the engine and the load on the engine are almost constant, the amount of intake air Ga and the temperature of the catalyst Tc are in a given correlation with each other. On the other hand, if the amount of intake air Ga and the temperature of the catalyst Tc deviate significantly from this correlation, the engine may be considered not to be operating steadily but to be performing an accelerating or decelerating operation, that is, a transitory operation.

Thus, the relationship between the amount of intake air Ga and the temperature of the catalyst Tc during a steady operation is pre-mapped so that when the actual values of the amount of intake air Ga and the temperature of the catalyst Tc are each within a predetermined range around the corresponding mapped value, the engine is determined to be operating steadily, resulting in a permitted diagnosis. In contrast, if each of the actual values is not within the predetermined range, the engine is determined not to be operating steadily, resulting in an inhibited diagnosis. This enables at least a given diagnosis accuracy to be ensured.

The prerequisites also include (2) the condition that at least the upstream catalyst 11 is active, (3) the condition that the pre-catalyst sensor 17 and the post-catalyst sensor 18 are active, and (4) the condition that no diagnosis is completed during the current trip.

The condition (2) is established if the estimated catalyst temperature falls within a predetermined activating temperature range. The condition (3) is established if the element temperatures of the pre-catalyst sensor 17 and the post-catalyst sensor 18 estimated by the ECU 20 fall within the respective activating temperature ranges. For the condition (4), the trip refers to the period between a start operation and a stop operation of the engine. According to the present embodiment, a diagnosis is carried out per trip, and the condition (4) is established if no diagnosis is completed during the current trip.

If the diagnosis permission flag is not on (the flag is off), the routine stands by. On the other hand, if the diagnosis permission flag is turned on, then in step S102, a lean amplitude Al and a rich amplitude Ar for the active air-fuel ratio control are set.

A reference value for the lean amplitude Al and the rich amplitude Ar is, for example, 0.5. In this case, with respect to the stoichiometry (for example, 14.6), the target air-fuel ratio A/Ff is, for example, 15.1 for the lean control and 14.1 for the rich control.

If the catalyst has a high degree of abnormality and the product of the amplitude and the flow rate of exhaust gas for the catalyst has a large value, unpurified gas may be instantaneously discharged, that is, in a very short time from the beginning of measurement. Thus, ensuring a sufficient measurement accuracy may be difficult.

Figure 11:
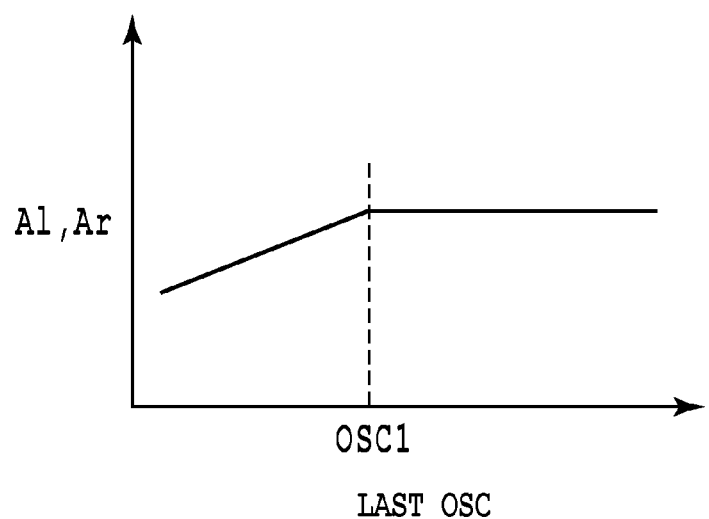
FIG. 11 is a map for use in setting a lean amplitude and a rich amplitude.

Thus, when the abnormality is at a high degree, the lean amplitude Al and the rich amplitude Ar are set according to the degree of the abnormality. Specifically, the lean amplitude Al and the rich amplitude Ar are set in accordance with a map pre-stored in the ECU 20 as shown in FIG. 11, based on the oxygen storage capacity measured during the last diagnosis (last OSC). The last OSC is used because this value reflects the current degree of abnormality of the catalyst best.

The map indicates that for an area where the abnormality is at a high degree, that is, an area where the last OSC is smaller than a predetermined value OSC1, the lean amplitude Al and rich amplitude Ar obtained increase with decreasing last OSC. Hence, for a higher degree of abnormality, the lean amplitude Al and the rich amplitude Ar may be reduced to decrease the product of the amplitude and the flow rate of exhaust gas. Then, the duration of measurement may be extended to allow a sufficient measurement accuracy to be easily achieved.

Furthermore, for an area where the abnormality of the catalyst is at a low degree, that is, an area where the last OSC is equal to or larger than the predetermined value OSC1, the lean amplitude Al and the rich amplitude Ar are set to a given reference value (0.5). A reduced amplitude extends the duration of measurement, increasing the likelihood that the prerequisites fail to be established during the measurement, causing the diagnosis to be discontinued. That is, the likelihood that an opportunity for diagnosis is missed increases. However, the present embodiment reduces the amplitude only when the last OSC is smaller than the predetermined value OSC1. This enables a reduction in the likelihood that an opportunity for diagnosis is missed.

Alternatively, when the last OSC is smaller than the predetermined value OSC1, the set values of the lean amplitude Al and the rich amplitude Ar may decrease with increasing flow rate of exhaust gas or amount of intake air Ga; the amount of intake air Ga is a substitute value for the flow rate of exhaust gas. This may also reduce the product of the amplitude and the flow rate of exhaust gas to allow a sufficient measurement accuracy to be easily achieved.

Then, in step S103, the target air-fuel ratio A/Ft is set to a rich value to allow the rich control to be performed.

In step S104, the method determines whether or not the pre-catalyst air-fuel ratio A/Ff is equal to or smaller than the stoichiometry. When the determination result is no, the method stands by. When the determination result is yes, the amount of released oxygen OSCb is measured in step S105.

Figure 12:
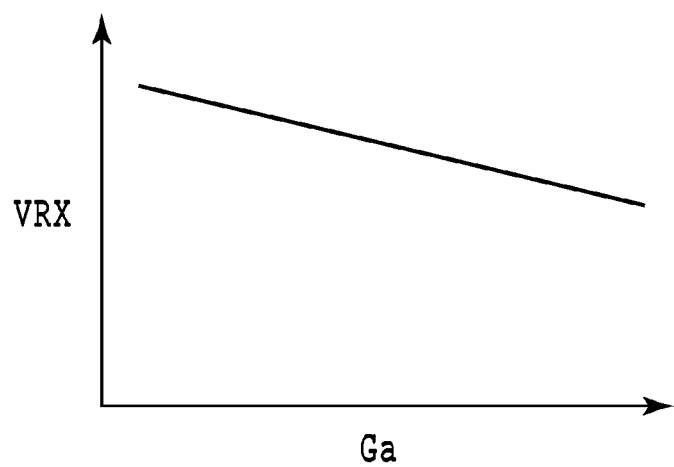
FIG. 12 is a map for use in setting a rich threshold.

Then, in step S106, the rich threshold VRX is set based on the flow rate of exhaust gas, specifically the amount of intake area Ga, which is a substitute value for the flow rate of exhaust gas. That is, here, the rich threshold VRX is not fixed to the stoichiometry equivalent value Vst and is varied depending on the amount of intake air Ga. The rich threshold VRX is set in accordance with such a pre-stored map as shown in FIG. 12.

The map indicates that the rich threshold VRX decreases (toward the lean side) with increasing amount of intake air Ga, allowing the measurement of the amount of released oxygen OSCb to be ended at an earlier timing. This enables a reduction in the adverse effects of the magnitude of the flow rate of exhaust gas on the rich peak Pr.

Then, in step S107, the output Vr from the post-catalyst sensor is compared with the rich threshold VRX. If the output Vr from the post-catalyst sensor is smaller than the rich threshold VRX, the method returns to step S105 to continue the measurement of the amount of released oxygen OSCb. On the other hand, if the output Vr from the post-catalyst sensor is equal to or larger than the rich threshold VRX, the method proceeds to step S108 to end the measurement of the amount of released oxygen OSCb.

Then, in step S109, the target air-fuel ratio A/Ft is set to a lean value to allow the lean control to be performed.

In step S110, the method determines whether or not the output Vr from the post-catalyst sensor has reached a rich-side peak. In this case, whether or not the differential value of the output Vr from the post-catalyst sensor has changed from positive to negative is determined.

When the determination result is no, the method stands by. When the determination result is yes, in step S111, the value of the output Vr from the post-catalyst sensor obtained when the value has reached the peak is determined to be the rich peak Pr.

Figure 13:
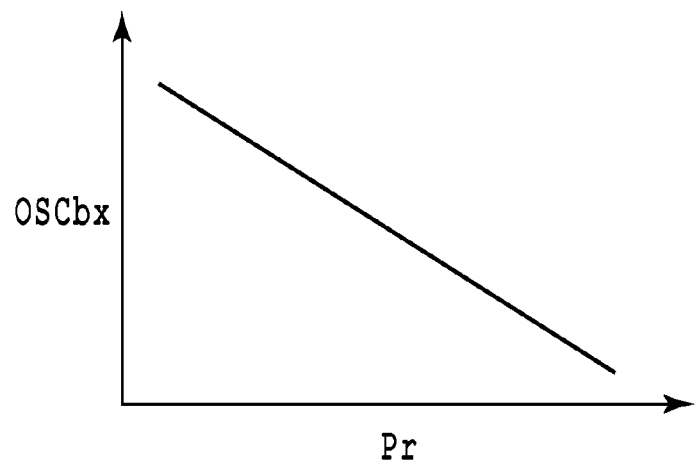
FIG. 13 is a map for use in calculating the amount of remaining oxygen to be released based on a rich peak.

Then, in step S112, the value of the amount of remaining oxygen OSCbx is calculated from the rich peak Pr. The amount of remaining oxygen refers to the amount of oxygen remaining in the catalyst and released between the point of time t2 and the point of time t3 under the rich control in FIG. 6 or the amount of oxygen absorbed during a similar period under the lean control (not shown in the drawings). In this case, the amount of remaining oxygen OSCbx is calculated based on such a pre-stored map as shown in FIG. 13.

The amount of remaining oxygen is expected to decrease with increasing rich peak Pr. Thus, the map shown in FIG. 13 indicates that the amount of remaining oxygen OSCbx may be reduced by increasing the rich peak Pr.

Thereafter, in steps S113 to S115, whether the catalyst is normal or abnormal is determined based on the amount of released oxygen OSCb measured in step S108 and the amount of remaining oxygen OSCbx calculated in step S112.

Figure 14:
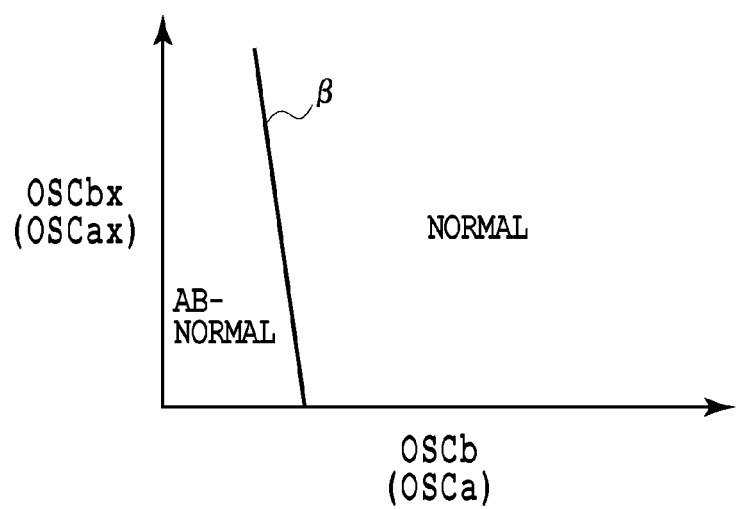
FIG. 14 is a map for use in determining whether the catalyst is normal or abnormal.

First, in step S113, the method determines whether or not the amount of released oxygen OSCb and the amount of remaining oxygen OSCbx are in a predetermined normal area. This determination is made in accordance with such a pre-stored map as shown in FIG. 14.

The map is a two-dimensional map that involves the amount of released oxygen OSCb (or the amount of absorbed oxygen OSCa) (the axis of abscissas) and the amount of remaining oxygen to be released OSCbx (the amount of oxygen remaining to be absorbed OSCax) (the axis of ordinate) as parameters. The area in the map is divided into a normal area and an abnormal area. A boundary β between the normal area and the abnormal area is formed at a position corresponding to a small amount of released oxygen OSCb. The boundary β is inclined from the axis of ordinate so that, for a smaller amount of remaining oxygen OSCbx, the catalyst is determined to be abnormal when a larger amount of oxygen OSCb is released.

If the amount of released oxygen OSCb and the amount of remaining oxygen OSCbx are in the normal area on the map, the method determines in step S114 that the catalyst is normal. On the other hand, if the amount of released oxygen OSCb and the amount of remaining oxygen OSCbx are not in the normal area on the map (that is, the amount of released oxygen OSCb and the amount of remaining oxygen OSCbx are in the abnormal area), the method determines in step S115 that the catalyst is abnormal.

Then, in step S116, the diagnosis permission flag is turned off, and this routine is terminated.

In this case, whether the catalyst is normal or abnormal is determined based on a single value of the amount of released oxygen OSCb, a single value of the rich peak Pr, and a single value of the amount of remaining oxygen OSCbx. However, a plurality of values may be acquired for each of the amount of released oxygen OSCb, the rich peak Pr, and the amount of remaining oxygen OSCbx may be acquired so that whether the catalyst is normal or abnormal is determined based on the average values thereof. This also applies to diagnosis processing described below.

Now, a second diagnosis processing method will be described with reference to FIG. 15A and FIG. 15B. The second diagnosis processing method uses the value of the lean peak Pl of the output Vr from the post-catalyst sensor.

The contents of the second diagnosis processing method are almost similar to the contents of the first diagnosis processing method except that according to the second diagnosis processing method, the rich-lean relationship according to the first diagnosis processing method is reversed. The differences between the two methods will mainly be described.

Steps S201 and S202 are similar to steps S101 and S102 described above. In step S203, the target air-fuel ratio A/Ft is set to a lean value to allow the lean control to be performed.

In step S204, the method determines whether or not the pre-catalyst air-fuel ratio A/Ff is equal to or larger than the stoichiometry. When the determination result is no, the method stands by. When the determination result is yes, the amount of absorbed oxygen OSCa is measured in step S205.

Then, in step S206, the lean threshold VLX is set based on the flow rate of exhaust gas, specifically the amount of intake area Ga, which is a substitute value for the flow rate of exhaust gas. That is, here, the lean threshold VLX is not fixed to the stoichiometry equivalent value Vst and is varied depending on the amount of intake air Ga.

Figure 16:
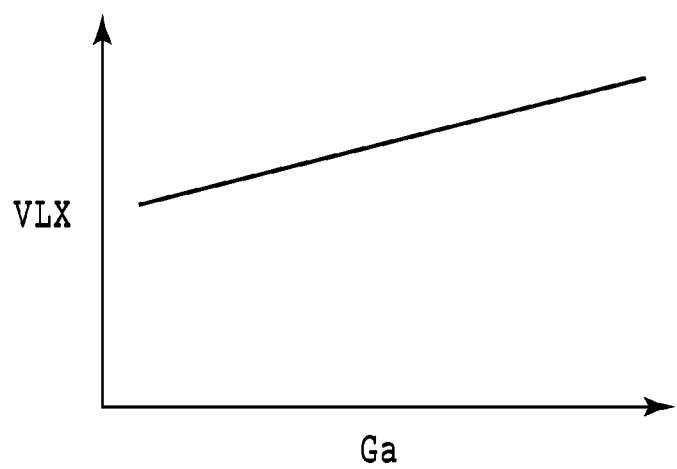
FIG. 16 is a map for use in setting a lean threshold.

The lean threshold VLX is set in accordance with such as pre-stored map as shown in FIG. 16. This map is in a reverse relationship with the map shown in FIG. 12; the threshold VLX increases (toward the rich side) consistently with the amount of intake air Ga. This allows the measurement of the amount of absorbed oxygen OSCa to be ended at an earlier timing.

In step S207, the output Vr from the post-catalyst sensor is compared with the lean threshold VLX. If the output Vr from the post-catalyst sensor is larger than the lean threshold VLX, the method returns to step S205 to continue the measurement of the amount of released oxygen OSCa. On the other hand, if the output Vr from the post-catalyst sensor is equal to or smaller than the rich threshold VLX, the method proceeds to step S208 to end the measurement of the amount of absorbed oxygen OSCa.

Then, in step S209, the target air-fuel ratio A/Ft is set to a rich value to allow the rich control to be performed.

In step S210, the method determines whether or not the output Vr from the post-catalyst sensor has reached a lean-side peak. In this case, whether or not the differential value of the output Vr from the post-catalyst sensor has changed from negative to positive is determined.

When the determination result is no, the method stands by. When the determination result is yes, in step S211, the value of the output Vr from the post-catalyst sensor obtained when the value has reached the peak is determined to be the lean peak Pl.

Then, in step S212, the value of the amount of remaining oxygen OSCax is calculated from the rich peak Pl. The amount of remaining oxygen OSCax is calculated based on such a pre-stored map as shown in FIG. 17.

Figure 17:
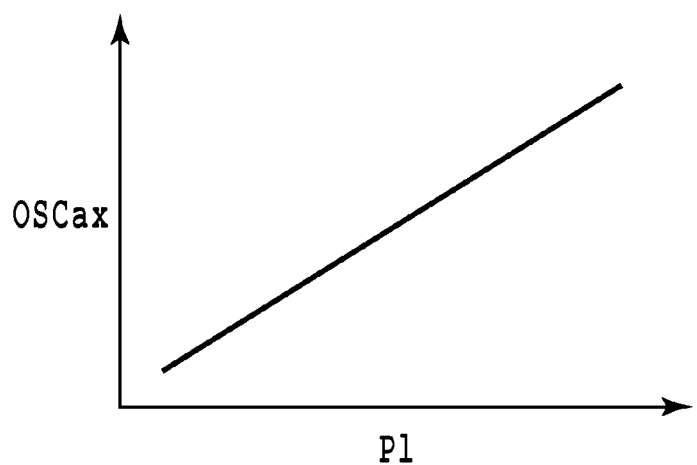
FIG. 17 is a map for use in calculating the amount of remaining absorbed oxygen based on a lean peak.

In contrast to the map shown in FIG. 13, the map shown in FIG. 17 indicates that the amount of remaining oxygen OSCax decreases consistently with the value of the lean peak Pl.

Thereafter, in steps S213 to S215, whether the catalyst is normal or abnormal is determined based on the amount of absorbed oxygen OSCa measured in step S208 and the amount of remaining oxygen OSCax calculated in step S212.

In step S213, the method determines whether or not the amount of absorbed oxygen OSCa and the amount of remaining oxygen OSCax are in a predetermined normal area. This determination is made using a map which is different from the map shown in FIG. 14 but which has a similar tendency.

If the amount of absorbed oxygen OSCa and the amount of remaining oxygen OSCax are in the normal area on the map, the method determines in step S214 that the catalyst is normal. On the other hand, if the amount of absorbed oxygen OSCa and the amount of remaining oxygen OSCax are not in the normal area on the map (that is, the amount of released oxygen OSCa and the amount of remaining oxygen OSCax are in the abnormal area), the method determines in step S215 that the catalyst is abnormal.

Then, in step S116, the diagnosis permission flag is turned off, and this routine is terminated.

The above-described first diagnosis processing method and second diagnosis processing method may of course be combined together. In this case, the combined method first calculates the average value of the measured amount of released oxygen OSCb and the measured amount of absorbed oxygen OSCa.

Then, the combined method calculates the average value of the absolute value of the difference (Pr−VRX) between the rich peak Pr and the rich threshold VRX and the absolute value of the difference (Pl−VLX) between the lean peak Pl and the lean threshold VLX, and then calculates the amount of remaining oxygen from the average value in accordance with a predetermined map. Then, whether the catalyst is normal or abnormal is determined by determining whether the amount of remaining oxygen and the average value of the amount of released oxygen OSCb and the amount of absorbed oxygen OSCa are in a predetermined normal area.

Now, a third diagnosis processing method will be described with reference to FIG. 18A and FIG. 18B. The third diagnosis processing method uses the rate Hr of rich change in the output Vr from the post-catalyst sensor.

The third diagnosis processing method is generally similar to the first diagnosis processing method (FIG. 10A and FIG. 10B) except that the third diagnosis processing method additionally includes step S311A and that step S112 in the first diagnosis processing method is changed to step S312. The differences between the two methods will mainly be described below.

Steps S301 to S311 are similar to steps S101 to S111 described above. In step S311A, the rate Hr of rich change in the output Vr from the post-catalyst sensor measured when the output Vr from the post-catalyst sensor changes from the rich threshold VRX to the rich peak Pr is calculated by Expression (2).

[Expression 2]

$$Hr = (Pr - VRX)/\Sigma Ga \quad (2)$$

Here, "$\Sigma Ga$" denotes a value obtained by integrating the amount of intake air Ga between a point of time tVRX when the output Vr from the post-catalyst sensor reaches the rich threshold VRX and a point of time tPr when the output Vr from the post-catalyst sensor reaches the rich peak Pr. Furthermore, VRX<Pr and tVRX<tPr. The rich change rate Hr increases consistently with the degree of abnormality of the catalyst. (tPr−tVRX) may be used instead of $\Sigma Ga$.

Figure 19:
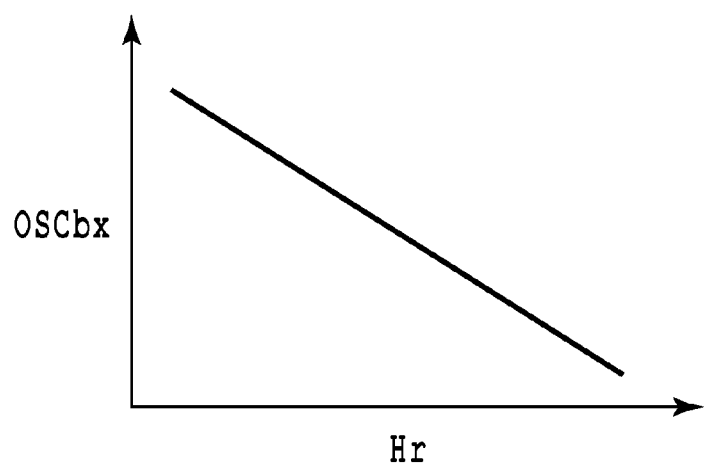
FIG. 19 is a map for use in calculating the amount of remaining oxygen to be released based on a rich change rate.

Then, in step S312, the value of the amount of remaining oxygen OSCbx is calculated from the value of the rich change rate Hr. The amount of remaining oxygen OSCbx is calculated from such a pre-stored map as shown in FIG. 19. Like the map shown in FIG. 13, the map shown in FIG. 19 indicates that the amount of remaining oxygen OSCbx decreases with increasing rich change rate Hr.

The subsequent steps S313 to S316 are also similar to steps S113 to S116 described above. A map for use in determining whether the catalyst is normal or abnormal in this case is also similar to the map shown in FIG. 14.

Figure 20B:
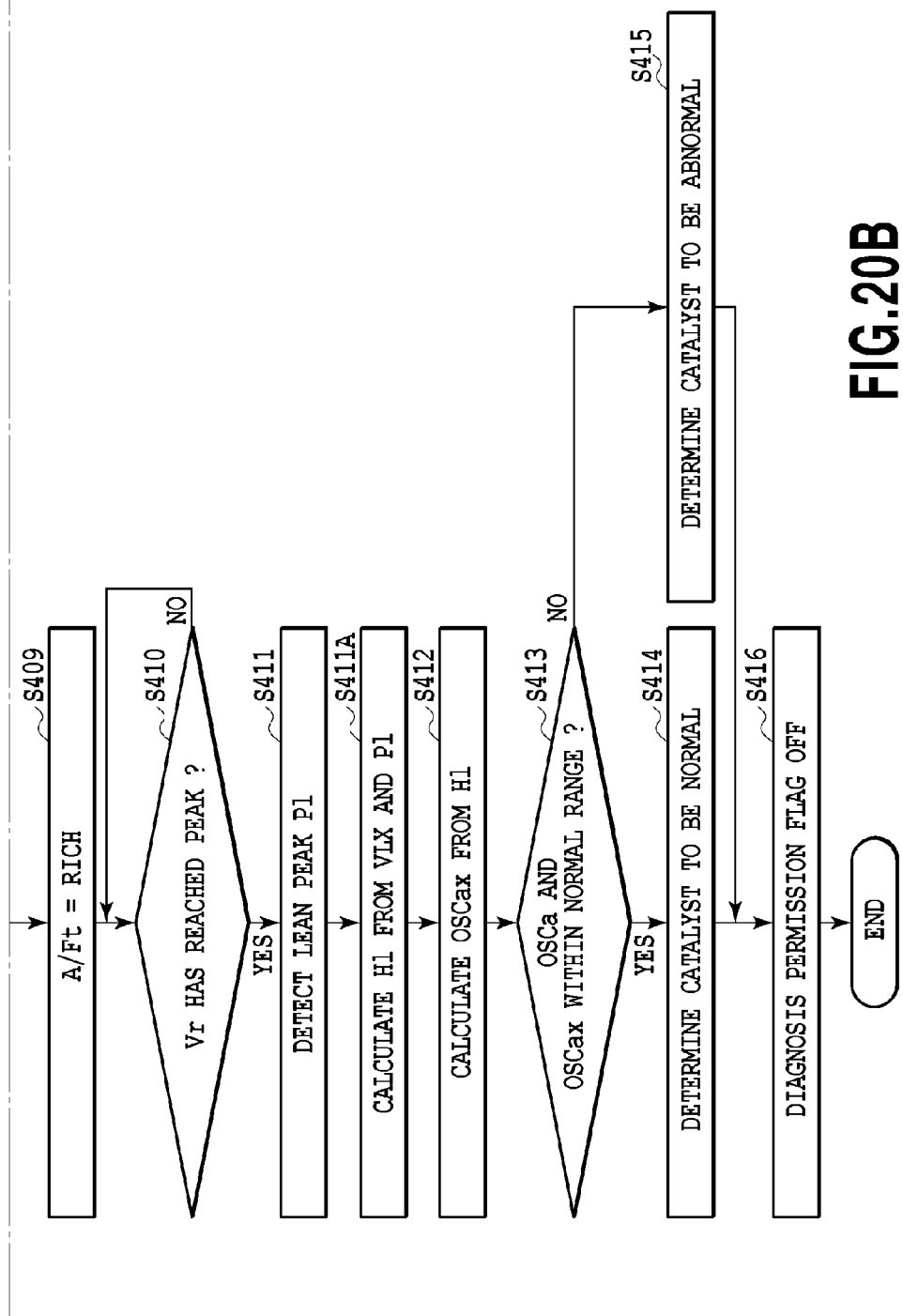
FIG. 20B is a flowchart regarding the fourth diagnosis processing method.

Now, a fourth diagnosis processing method will be described with reference to FIG. 20A and FIG. 20B. The fourth diagnosis processing method uses the rate Hl of lean change in the output Vr from the post-catalyst sensor.

The fourth diagnosis processing method is generally similar to the second diagnosis processing method (FIG. 15A and FIG. 15B) except that the fourth diagnosis processing method additionally includes step S411A and that step S212 in the second diagnosis processing method is changed to step S412. The differences between the two methods will mainly be described below.

Steps S401 to S411 are similar to steps S201 to S211 described above. In step S411A, the rate Hl of lean change in the output Vr from the post-catalyst sensor measured when the output Vr from the post-catalyst sensor changes from the lean threshold VLX to the lean peak Pl is calculated by Expression (3).

[Expression 3]

$$Hl = (Pl - VLX)/\Sigma Ga \quad (3)$$

Here, "$\Sigma Ga$" similarly denotes a value obtained by integrating the amount of intake air Ga between a point of time tVLX when the output Vr from the post-catalyst sensor reaches the lean threshold VLX and a point of time tPl when the output Vr from the post-catalyst sensor reaches the rich peak Pl. In this case, tVLX<tPl but Pl<VLX. The lean change rate Hl increases in a minus direction consistently with the degree of abnormality of the catalyst. (tPl−tVLX) may be used instead of $\Sigma Ga$.

Figure 21:
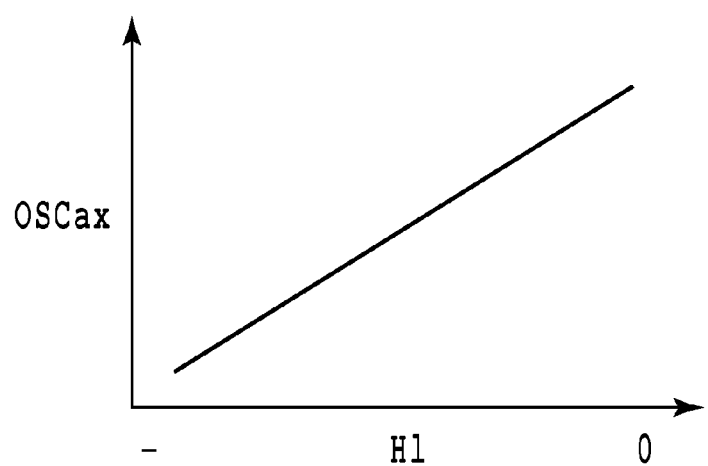
FIG. 21 is a map for use in calculating the amount of remaining absorbed oxygen based on a lean change rate.

Then, in step S412, the value of the amount of remaining oxygen OSCax is calculated from the value of the lean change rate Hl. The amount of remaining oxygen OSCax is calculated based on such a pre-stored map as shown in FIG. 21. Like the map shown in FIG. 17, the map shown in FIG. 21 indicates that the amount of remaining oxygen OSCax decreases consistently with the value of the lean change rate Hl.

The subsequent steps S413 to S416 are similar to steps S213 to S216 described above. A map for use in determining whether the catalyst is normal or abnormal in this case is also similar to the map shown in FIG. 14.

The above-described third diagnosis processing method and fourth diagnosis processing method may of course be combined together. In this case, the combined method first calculates the average value of the measured amount of released oxygen OSCb and the measured amount of absorbed oxygen OSCa. Then, the combined method calculates the average value of the absolute value of the rich change rate Hr and the absolute value of the lean change rate Hl, and then calculates the amount of remaining oxygen from the average value in accordance with a predetermined map. Then, whether the catalyst is normal or abnormal is determined by determining whether the amount of remaining oxygen and the average value of the amount of released oxygen OSCb and the amount of absorbed oxygen OSCa are in a predetermined normal area.

As described above, the present embodiment can reduce measurement errors to improve the diagnosis accuracy, thus suppressing erroneous diagnoses.

The embodiment of the present invention has been described in detail. However, various other embodiments of the present invention are possible. For example, the internal combustion engine may have any applications and may be in any form. The internal combustion engine may be used for applications other than automobiles and may be of a direct injection type. Some portions of the above description refer to only one of the lean side and the rich side and of the absorption side and the release side. However, it is apparent to those skilled in the art that the description of one of the two items also allows the other to be understood.

The present invention includes any variations, applications, and equivalents embraced by the concepts of the present invention defined by the claims. Thus, the present invention should not be interpreted in a limited manner but is applicable to any other techniques belonging to the range of concepts of the present invention.

The invention claimed is:

1. A catalyst abnormality diagnosis apparatus that diagnoses abnormality of a catalyst arranged in an exhaust passage in an internal combustion engine, comprising:
    a post-catalyst sensor that detects an exhaust air-fuel ratio in an area located downstream of the catalyst;
    active air-fuel ratio control unit for alternately controlling an air-fuel ratio in an area located upstream of the catalyst between a lean side and a rich side;
    measurement unit for measuring an amount of oxygen absorbed and released by the catalyst during lean control and rich control of the air-fuel ratio; and
    determination unit for determining whether the catalyst is normal or abnormal,
    wherein when an output from the post-catalyst sensor reaches a predetermined threshold, the active air-fuel ratio control unit simultaneously switches between the lean control and the rich control, and the measurement unit ends measuring the amount of oxygen,
    the threshold includes a lean threshold that defines a timing for switching from the lean control to the rich control and a rich threshold that defines a timing for switching from the rich control to the lean control,
    the lean threshold is set to a value richer than a reference lean determination value set leaner than a stoichiometry equivalent value for the output from the post-catalyst sensor, and is set to a value richer than the stoichiometry equivalent value,
    the rich threshold is set to a value leaner than a reference rich determination value set richer than the stoichiometry equivalent value, and is set to a value leaner than the stoichiometry equivalent value,
    when the output from the post-catalyst sensor reaches the rich threshold during change to a rich side, the active air-fuel ratio control unit simultaneously switches the air-fuel ratio control from the rich control to the lean control, when the output from the post-catalyst sensor reaches the lean threshold during change to a lean side, the active air-fuel ratio control unit simultaneously switches the air-fuel ratio control from the lean control to the rich control, and the determination unit determines whether the catalyst is normal or abnormal based on the amount of oxygen measured until the output from the post-catalyst sensor reaches one of the lean threshold and the rich threshold and behavior of the output from the post-catalyst sensor observed after the output from the post-catalyst sensor reaches one of the lean threshold and the rich threshold.

2. The catalyst abnormality diagnosis apparatus according to claim 1, wherein the determination unit determines whether the catalyst is normal or abnormal based on the amount of oxygen measured until the output from the post-catalyst sensor reaches one of the lean threshold and the rich threshold and a peak value of the output from the post-catalyst sensor measured after the output from the post-catalyst sensor reaches one of the lean threshold and the rich threshold.

3. The catalyst abnormality diagnosis apparatus according to claim 1, wherein the determination unit determines whether the catalyst is normal or abnormal based on the amount of oxygen measured until the output from the post-catalyst sensor reaches one of the lean threshold and the rich threshold and a rate of change in the output from the post-catalyst sensor which occurs after the output from the post-catalyst sensor reaches one of the lean threshold and the rich threshold.

4. The catalyst abnormality diagnosis apparatus according to claim 3, wherein the change rate is the rate of change occurring after the output from the post-catalyst sensor reaches one of the lean threshold and the rich threshold and before the output from the post-catalyst sensor reaches a peak.

5. The catalyst abnormality diagnosis apparatus according to claim 3, wherein the change rate has a value obtained by dividing a difference in the output from the post-catalyst sensor between a point of time when the output from the post-catalyst sensor reaches one of the lean threshold and the rich threshold and a point of time when the output from the post-catalyst sensor reaches a predetermined value, by an amount of exhaust gas measured during the period between the points of time.

6. The catalyst abnormality diagnosis apparatus according to claim 1, wherein each of the lean threshold and the rich threshold is set according to a flow rate of exhaust gas.

7. The catalyst abnormality diagnosis apparatus according to claim 1, wherein an amplitude for the lean control and the rich control is set according to the amount of oxygen measured during a last diagnosis.

8. A catalyst abnormality diagnosis apparatus that diagnoses abnormality of a catalyst arranged in an exhaust passage in an internal combustion engine, comprising:

a post-catalyst sensor that detects an exhaust air-fuel ratio in an area located downstream of the catalyst;

active air-fuel ratio control unit for alternately controlling an air-fuel ratio in an area located upstream of the catalyst between a lean side and a rich side;

measurement unit for measuring an amount of oxygen released by the catalyst during rich control of the air-fuel ratio; and determination unit for determining whether the catalyst is normal or abnormal, and in that when an output from the post-catalyst sensor reaches a predetermined rich threshold during change to a rich side, the active air-fuel ratio control unit simultaneously switches the air-fuel ratio control from the rich control to the lean control, and the measurement unit ends measuring the amount of oxygen, the rich threshold is set to a value leaner than a reference rich determination value set richer than the stoichiometry equivalent value, and is set to a value leaner than the stoichiometry equivalent value, and the determination unit determines whether the catalyst is normal or abnormal based on the amount of oxygen measured until the output from the post-catalyst sensor reaches the rich threshold and behavior of the output from the post-catalyst sensor observed after the output from the post-catalyst sensor reaches the rich threshold.

9. A catalyst abnormality diagnosis apparatus that diagnoses abnormality of a catalyst arranged in an exhaust passage in an internal combustion engine, by comprising:

a post-catalyst sensor that detects an exhaust air-fuel ratio in an area located downstream of the catalyst;

active air-fuel ratio control unit for alternately controlling an air-fuel ratio in an area located upstream of the catalyst between a lean side and a rich side;

measurement unit for measuring an amount of oxygen absorbed by the catalyst during lean control of the air-fuel ratio; and determination unit for determining whether the catalyst is normal or abnormal, and in that when an output from the post-catalyst sensor reaches a predetermined lean threshold during change to a lean side, the active air-fuel ratio control unit simultaneously switches the air-fuel ratio control from the lean control to the rich control, and the measurement unit ends measuring the amount of oxygen, the lean threshold is set to a value richer than a reference lean determination value set leaner than a stoichiometry equivalent value for the output from the post-catalyst sensor, and is set to a value richer than the stoichiometry equivalent value, and the determination unit determines whether the catalyst is normal or abnormal based on the amount of oxygen measured until the output from the post-catalyst sensor reaches the lean threshold and behavior of the output from the post-catalyst sensor observed after the output from the post-catalyst sensor reaches the lean threshold.

* * * * *